United States Patent
Gao et al.

(10) Patent No.: US 11,487,049 B2
(45) Date of Patent: Nov. 1, 2022

(54) OPTICAL IMAGING LENS GROUP

(71) Applicant: Zhejiang Sunny Optical Co., Ltd., Ningbo (CN)

(72) Inventors: Xue Gao, Ningbo (CN); Ming Li, Ningbo (CN); Jianke Wenren, Ningbo (CN)

(73) Assignee: Zhejiang Sunny Optical Co., Ltd.

(*) Notice: Subject to any disclaimer, the term of this patent is extended or adjusted under 35 U.S.C. 154(b) by 352 days.

(21) Appl. No.: 16/871,706

(22) Filed: May 11, 2020

(65) Prior Publication Data

US 2020/0271899 A1 Aug. 27, 2020

Related U.S. Application Data

(63) Continuation of application No. PCT/CN2019/076962, filed on Mar. 5, 2019.

(30) Foreign Application Priority Data

Jun. 6, 2018 (CN) .......................... 201810573723.9

(51) Int. Cl.
*G02B 3/02* (2006.01)
*G02B 13/18* (2006.01)
(Continued)

(52) U.S. Cl.
CPC ................. *G02B 3/02* (2013.01); *G02B 9/62* (2013.01); *G02B 13/02* (2013.01); *G02B 13/18* (2013.01);
(Continued)

(58) Field of Classification Search
CPC .......... G02B 27/646; G02B 7/08; G02B 7/09; G02B 15/173; G02B 15/14; G02B 15/177;
(Continued)

(56) References Cited

U.S. PATENT DOCUMENTS

2016/0139366 A1* 5/2016 Jung .................. G02B 13/0045
359/713
2016/0216486 A1 7/2016 Tanaka
2017/0082833 A1 3/2017 Huang

FOREIGN PATENT DOCUMENTS

CN 104423015 3/2015
CN 104570281 4/2015
(Continued)

OTHER PUBLICATIONS

First Examination Report from Intellectual Property of India, Application No. 202017019905, dated May 31, 2021, 5 pages.

*Primary Examiner* — William R Alexander
*Assistant Examiner* — Tamara Y. Washington
(74) *Attorney, Agent, or Firm* — Barnes & Thornburg LLP

(57) ABSTRACT

The present disclosure discloses an optical imaging lens group including, sequentially from an object side to an image side along an optical axis, a first lens, a second lens, a third lens, a fourth lens, a fifth lens and a sixth lens. The first lens has a refractive power, an object-side surface of the first lens is a concave surface, and an image-side surface of the first lens is a convex surface; the second lens has a positive refractive power; the third lens has a negative refractive power; the fourth lens has a refractive power; the fifth lens has a negative refractive power, and the sixth lens has a refractive power. An effective focal length f2 of the second lens and a radius of curvature R3 of an object-side surface of the second lens satisfy $1.5 < f2/R3 < 2$.

20 Claims, 14 Drawing Sheets

(51) Int. Cl.
  *G02B 9/62* (2006.01)
  *G02B 27/00* (2006.01)
  *G02B 13/02* (2006.01)
  *G02B 13/00* (2006.01)

(52) U.S. Cl.
  CPC ...... *G02B 27/0025* (2013.01); *G02B 13/0045* (2013.01)

(58) Field of Classification Search
  CPC ........ G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; G03B 5/00; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; G03B 3/00; G03B 5/02; G03B 5/06
  See application file for complete search history.

(56) References Cited

FOREIGN PATENT DOCUMENTS

| | | |
|---|---|---|
| CN | 104730682 | 6/2015 |
| CN | 204422844 U | 6/2015 |
| CN | 204422845 U | 6/2015 |
| CN | 106338815 | 1/2017 |
| CN | 106842503 A | 6/2017 |
| CN | 106997087 A | 8/2017 |
| CN | 107329234 | 11/2017 |
| CN | 107329234 A | 11/2017 |
| CN | 108535845 | 9/2018 |
| CN | 208477190 | 2/2019 |

* cited by examiner

OPTICAL IMAGING LENS GROUP

CROSS-REFERENCE TO RELATED APPLICATIONS

The present patent application is a continuation of International Application No. PCT/CN2019/076962, filed on Mar. 5, 2019, which claims priority to Chinese Patent Application No. 201810573723.9, filed before the China National Intellectual Property Administration (CNIPA) on Jun. 6, 2018. Both of the aforementioned patent applications are hereby incorporated by reference in their entireties.

TECHNICAL FIELD

The present disclosure relates to an optical imaging lens group, and more specifically, relates to an optical imaging lens group with six lenses and having telephoto characteristics.

BACKGROUND

In recent years, mobile phones have become an indispensable communication device in people's lives. People's requirements on mobile phone functions have become stricter, especially for the camera functions which is commonly used in mobile phones. The camera mounted on the mobile phone is not only required to have high-pixel, high-resolution, large field-of-view and other characteristics, but also required to have telephoto characteristics, so that it can clearly capture objects at a further distant.

Therefore, the present invention proposes an optical imaging lens group having characteristics of long focal length, large imaging on a negative film, low sensitivity, etc. and which is suitable for portable electronic products.

SUMMARY

The present disclosure provides an optical imaging lens group, for example, a lens group with telephoto characteristics, that is applicable to portable electronic products and at least solves or partially addresses at least one of the above disadvantages of the prior art.

The present disclosure provides an optical imaging lens group which includes, sequentially from an object side to an image side along an optical axis, a first lens, a second lens, a third lens, a fourth lens, a fifth lens and a sixth lens. The first lens has a positive refractive power or a negative refractive power, an object-side surface of the first lens may be a concave surface, and an image-side surface of the first lens may be a convex surface; the second lens may have a positive refractive power; the third lens may have a negative refractive power; the fourth lens has a positive refractive power or a negative refractive power; the fifth lens may have a negative refractive power; and the sixth lens has a positive refractive power or a negative refractive power.

In one embodiment, an effective focal length f2 of the second lens and a radius of curvature R3 of an object-side surface of the second lens may satisfy $1.5<f2/R3<2$.

In one embodiment, half of a maximal field-of-view HFOV of the optical imaging lens group may satisfy $\tan(\text{HFOV})<0.5$.

In one embodiment, a total effective focal length f of the optical imaging lens group and an effective focal length f3 of the third lens may satisfy $-2.5<f/f3<-1$.

In one embodiment, a total effective focal length f of the optical imaging lens group and an effective focal length f5 of the fifth lens may satisfy $-2<f/f5<-0.5$.

In one embodiment, a radius of curvature R1 of the object-side surface of the first lens and a radius of curvature R8 of an image-side surface of the fourth lens may satisfy $2<R1/R8<3.2$.

In one embodiment, a radius of curvature R2 of the image-side surface of the first lens and a total effective focal length f of the optical imaging lens group may satisfy $-1.5<R2/f<-0.5$.

In one embodiment, a total effective focal length f of the optical imaging lens group and a combined focal length f23 of the second lens and the third lens may satisfy $1<f/f23<2$.

In one embodiment, a total effective focal length f of the optical imaging lens group and a combined focal length f45 of the fourth lens and the fifth lens may satisfy $-1<f/f45<0$.

In one embodiment, a center thickness CT6 of the sixth lens along the optical axis and a center thickness CT2 of the second lens along the optical axis may satisfy $0<CT6/CT2<1$.

In one embodiment, a spaced interval T34 between the third lens and the fourth lens along the optical axis and a spaced interval T56 between the fifth lens and the sixth lens along the optical axis may satisfy $0<T34/T56<1$.

In one embodiment, a total effective focal length f of the optical imaging lens group and an effective focal length f1 of the first lens may satisfy $|f/f1|<0.5$.

In one embodiment, both of the object-side surface and the image-side surface of the first lens may be spherical.

In one embodiment, a center thickness CT1 of the first lens along the optical axis and a spaced interval T12 of the first lens and the second lens along the optical axis may satisfy $1.6<CT1/T12<2.6$.

In one embodiment, an edge thickness ET6 at a maximum effective radius of the sixth lens and a center thickness CT6 of the sixth lens along the optical axis may satisfy $0.3<ET6/CT6<0.8$.

The present disclosure employs six lenses, and the optical imaging lens group has at least one advantageous effect such as long focal length, large imaging on the negative film, and low sensitivity and the like by rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings.

DETAILED DESCRIPTION OF EMBODIMENTS

Figure 1:
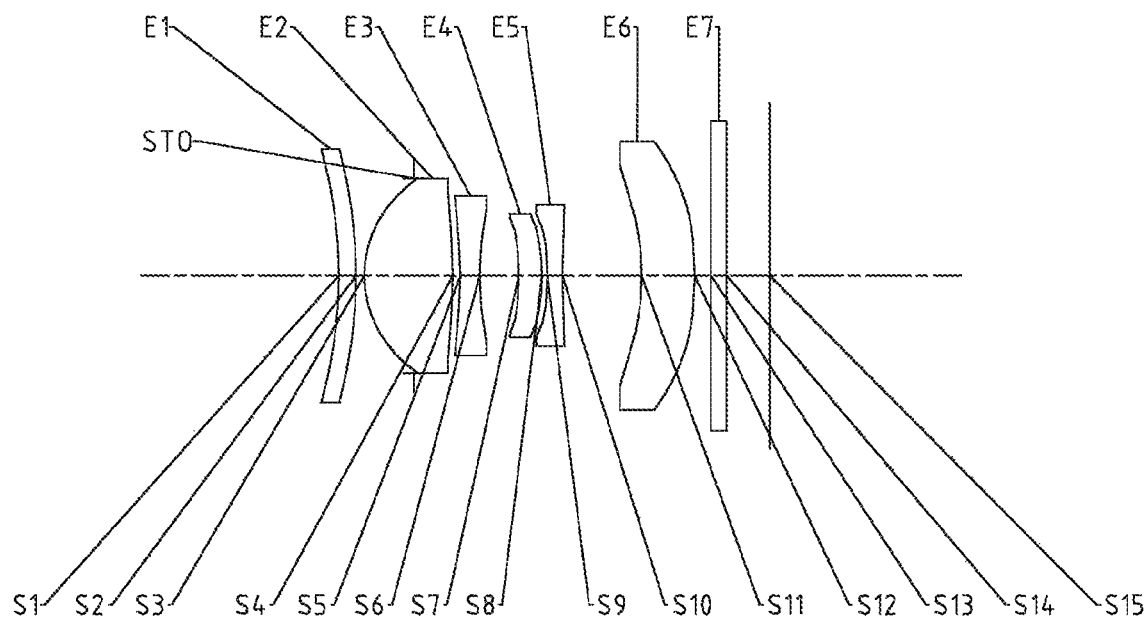
FIG. 1 illustrates a schematic structural view of an optical imaging lens group according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface close to the object side is referred to as an object-side surface of the lens, and the surface close to the image side is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

An optical imaging lens group according to an exemplary embodiment of the present disclosure may include, for example, six lenses having refractive power, i.e. a first lens, a second lens, a third lens, a fourth lens, a fifth lens and a sixth lens. The six lenses are arranged sequentially from an object side to an image side along an optical axis, and an air gap is provided between each adjacent lens.

In an exemplary embodiment, the first lens has a positive refractive power or a negative refractive power, an object-side surface of the first lens may be a concave surface, and an image-side surface of the first lens may be a convex surface; the second lens may have a positive refractive power; the third lens may have a negative refractive power; the fourth lens has a positive refractive power or a negative refractive power; the fifth lens may have a negative refractive power; and the sixth lens has a positive refractive power or a negative refractive power.

In an exemplary embodiment, an object-side surface of the second lens may be a convex surface.

In an exemplary embodiment, an image-side surface of the fourth lens may be a convex surface.

In an exemplary embodiment, both of the object-side surface and the image-side surface of the first lens may be spherical. The object-side surface and the image-side surface of the first lens are both arranged as spherical surface, which may effectively correct the field curvature of the optical system.

In an exemplary embodiment, the optical imaging lens group according to the present disclosure may satisfy tan(HFOV)<0.5, where HFOV is half of a maximal field-of-view of the optical imaging lens group. More specifically, HFOV may further satisfy $0.3<\tan(\text{HFOV})\leq 0.4$, for example, $0.35\leq\tan(\text{HFOV})\leq 0.39$. By reasonably controlling half of a maximal field-of-view of the optical imaging lens group, the image quality of the optical system may be effectively balanced.

In an exemplary embodiment, the optical imaging lens group according to the present disclosure may satisfy $1.5<f2/R3<2$, where f2 is an effective focal length of the second lens and R3 is a radius of curvature of an object-side surface of the second lens. More specifically, f2 and R3 may further satisfy $1.52\leq f2/R3<1.83$. By reasonably controlling the ratio between the effective focal length of the second lens and the radius of curvature of the object-side surface of the second lens, the astigmatic and distortion of the system may be reduced.

In an exemplary embodiment, the optical imaging lens group according to the present disclosure may satisfy $-2.5<f/f3<-1$, where f is a total effective focal length of the optical imaging lens group and f3 is an effective focal length of the third lens. More specifically, f and f3 may further satisfy $-2.2\leq f/f3\leq-1.2$, for example, $-2.08\leq f/f3\leq-1.33$. By reasonably allocating the ratio of the total effective focal length of the optical imaging lens group to the effective focal length of the third lens, the refractive power may be effectively assigned to compensate the spherical aberration and distortion of the system.

In an exemplary embodiment, the optical imaging lens group according to the present disclosure may satisfy $-2<f/f5<-0.5$, where f is a total effective focal length of the optical imaging lens group and f5 is an effective focal length of the fifth lens. More specifically, f and f5 may further satisfy $-1.70\leq f/f5\leq-0.60$, for example, $-1.60\leq f/f5\leq-0.64$. By reasonably allocating the ratio of the total effective focal length of the optical imaging lens group to the effective focal length of the fifth lens, the refractive power may be effectively assigned, and the sensitivity of the system may be reduced.

In an exemplary embodiment, the optical imaging lens group according to the present disclosure may satisfy $2<R1/R8<3.2$, where R1 is a radius of curvature of the object-side surface of the first lens and R8 is a radius of curvature of an image-side surface of the fourth lens. More specifically, R1 and R8 may further satisfy $2.02\leq R1/R8\leq 3.16$. By reasonably controlling the ratio of the radius of curvature of the object-side surface of the first lens to the radius of curvature of the image-side surface of the fourth lens, the chief ray angle of the chip may be better matched.

In an exemplary embodiment, the optical imaging lens group according to the present disclosure may satisfy $-1.5<R2/f<-0.5$, where R2 is a radius of curvature of the image-side surface of the first lens and f is a total effective focal length of the optical imaging lens group. More specifically, R2 and f may further satisfy $-1.5<R2/f\leq-0.80$, for example, $-1.40\leq R2/f\leq-0.86$. By reasonably controlling the ratio of the radius of curvature of the image-side surface of the first lens to the total effective focal length of the optical imaging lens group, the spherical aberration, coma, astigmatic, and distortion of the system may be effectively compensated.

In an exemplary embodiment, the optical imaging lens group according to the present disclosure may satisfy $1<f/f23<2$, where f is a total effective focal length of the optical imaging lens group and f23 is a combined focal length of the second lens and the third lens. More specifically, f and f23 may further satisfy $1.1\leq f/f23\leq 1.7$, for example, $1.15\leq f/f23\leq 1.64$. By reasonably controlling the ratio between the total effective focal length of the optical imaging lens group and the combined focal length of the second lens and the third lens, the spherical aberration and distortion of the system may be effectively compensated.

In an exemplary embodiment, the optical imaging lens group according to the present disclosure may satisfy $-1<f/f45<0$, where f is a total effective focal length of the optical imaging lens group and f45 is a combined focal length of the fourth lens and the fifth lens. More specifically, f and f45 may further satisfy $-0.93\leq f/f45\leq-0.19$. Reasonably controlling the ratio between the total effective focal length of the optical imaging lens group and the combined focal length of the fourth lens and the fifth lens may effectively compensate the astigmatic and distortion of the system.

In an exemplary embodiment, the optical imaging lens group according to the present disclosure may satisfy $0<CT6/CT2<1$, where CT6 is a center thickness of the sixth lens along the optical axis and CT2 is a center thickness of the second lens along the optical axis. More specifically, CT6 and CT2 may further satisfy $0.2\leq CT6/CT2\leq 0.8$, for example, $0.22\leq CT6/CT2\leq 0.79$. By reasonably controlling the ratio between CT6 and CT2, the miniaturized structure of the optical system may be ensured.

In an exemplary embodiment, the optical imaging lens group according to the present disclosure may satisfy $0<T34/T56<1$, where T34 is a spaced interval between the third lens and the fourth lens along the optical axis and T56 is a spaced interval between the fifth lens and the sixth lens along the optical axis. More specifically, T34 and T56 may further satisfy $0.2\leq T34/T56\leq 0.9$, for example, $0.29\leq T34/T56<0.82$. Reasonably arranging the spaced interval between the third lens and the fourth lens along the optical axis and the spaced interval between the fifth lens and the sixth lens along the optical axis helps to smooth the deflection angle of the light and reduce the sensitivity of the system.

In an exemplary embodiment, the optical imaging lens group according to the present disclosure may satisfy $|f/f1|<0.5$, where f is a total effective focal length of the optical imaging lens group and f1 is an effective focal length of the first lens. More specifically, f and f1 may further satisfy $0\leq|f/f1|\leq 0.2$, for example, $0.02\leq|f/f1|\leq 0.13$. By reasonably arranging the ratio between the total effective focal length of the optical imaging lens group and the effective focal length of the first lens, the refractive power of the front end of the optical system to the light may be effectively reduced.

In an exemplary embodiment, the optical imaging lens group according to the present disclosure may satisfy $1.6<CT1/T12<2.6$, where CT1 is a center thickness of the first lens along the optical axis and T12 is a spaced interval of the first lens and the second lens along the optical axis. More specifically, CT1 and T12 may further satisfy 1.66≤CT1/T12≤2.56. By reasonably distributing the ratio between CT1 and T12, the astigmatic and distortion of the optical system may be effectively corrected, and at the same time, the characteristic of a compact size of the lens assembly may be ensured.

In an exemplary embodiment, the optical imaging lens group according to the present disclosure may satisfy 0.3≤ET6/CT6<0.8, where ET6 is an edge thickness at a maximum effective radius of the sixth lens and CT6 is a center thickness of the sixth lens along the optical axis. More specifically, ET6 and CT6 may further satisfy 0.32≤ET6/CT6≤0.79. By reasonably controlling the edge thickness of the sixth lens and the center thickness of the sixth lens along the optical axis, the size of the system may be effectively reduced and the telephoto characteristics may be satisfied. At the same time, by this, the system structure can be effectively adjusted so as to reduce the difficulty of lens processing and assembly.

In an exemplary embodiment, the optical imaging lens group described above may further include at least one stop to improve the image quality of the lens assembly. For example, the stop may be disposed between the first lens and the second lens.

Optionally, the above optical imaging lens group may further include an optical filter for correcting the color deviation and/or a protective glass for protecting the photosensitive element on the imaging plane.

The optical imaging lens group according to the above embodiments of the present disclosure may employ a plurality of lenses, such as six lenses as described above. By properly assigning the refractive power of each lens, the surface shape, the center thickness of each lens, and spaced intervals on the optical axis between the lenses, the size and the sensitivity of the lens assembly may be effectively reduced, and the workability of the lens assembly may be improved, such that the optical imaging lens group is more advantageous for production processing and may be applied to portable electronic products such as mobile phones. The optical imaging lens group configured as described above may also have advantageous effects such as a longer focal length and a smaller field-of-view, larger imaging on the negative film, and low sensitivity and the like.

In the embodiments of the present disclosure, at least one of the surfaces of each lens other than the first lens is aspheric. The aspheric lens is characterized by a continuous change in curvature from the center of the lens to the periphery of the lens. Unlike a spherical lens, the aspheric lens has a better curvature radius characteristic, and has the advantages of improving distortion aberration and improving astigmatic aberration. By using more aspheric lenses in the system, the aberrations that occur during imaging may be eliminated as much as possible, and thus improving the image quality.

However, it will be understood by those skilled in the art that the number of lenses constituting the optical imaging lens group may be varied to achieve the various results and advantages described in this specification without departing from the technical solution claimed by the present disclosure. For example, although the embodiment is described by taking six lenses as an example, the optical imaging lens group is not limited to include six lenses. The optical imaging lens group may also include other numbers of lenses if desired. Some specific examples of an optical imaging lens group applicable to the above embodiments will be further described below with reference to the accompanying drawings.

EXAMPLE 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 1 shows surface type, radius of curvature, thickness, material and conic coefficient of each lens of the optical imaging lens group in example 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | spherical | −6.1985 | 0.2300 | 1.55 | 56.1 | |
| S2 | spherical | −6.4722 | 0.7700 | | | |
| STO | spherical | infinite | −0.6606 | | | |
| S3 | aspheric | 1.4940 | 1.1821 | 1.55 | 56.1 | −0.3182 |

TABLE 1-continued

| Surface number | Surface type | Radius of curvature | Thickness | Material Refractive index | Abbe number | Conic coefficient |
|---|---|---|---|---|---|---|
| S4 | aspheric | −6.8209 | 0.1019 | | | 17.1335 |
| S5 | aspheric | −5.2969 | 0.2559 | 1.66 | 21.5 | −33.6027 |
| S6 | aspheric | 4.0483 | 0.5215 | | | −57.8689 |
| S7 | aspheric | −4.8549 | 0.3100 | 1.65 | 23.5 | −46.1004 |
| S8 | aspheric | −2.6422 | 0.0734 | | | −73.5083 |
| S9 | aspheric | −4.9929 | 0.2000 | 1.55 | 56.1 | 3.0119 |
| S10 | aspheric | 4.9933 | 1.0578 | | | −76.3837 |
| S11 | aspheric | −4.3768 | 0.7063 | 1.65 | 23.5 | −72.2768 |
| S12 | aspheric | −6.5693 | 0.2179 | | | −10.0732 |
| S13 | spherical | infinite | 0.2100 | 1.52 | 64.2 | |
| S14 | spherical | infinite | 0.5739 | | | |
| S15 | spherical | infinite | | | | |

As can be seen from Table 1, both of the object-side surface and the image-side surface of the first lens E1 are spherical, and the object-side surface and the image-side surface of any one of the second lens E2 to the sixth lens E6 are aspheric. In this example, the surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S3-S12 in example 1.

Table 3 shows effective focal lengths f1 to f6 of respective lens, a total effective focal length f of the optical imaging lens group, a total track length TTL (i.e., the distance from the object-side surface S1 of the first lens E1 to the imaging plane S15 along the optical axis) and half of a maximal field-of-view HFOV in example 1.

TABLE 3

| f1 (mm) | −381.71 |
|---|---|
| f2 (mm) | 2.36 |
| f3 (mm) | −3.46 |
| f4 (mm) | 8.53 |
| f5 (mm) | −4.54 |
| f6 (mm) | −23.29 |
| f (mm) | 5.81 |
| TTL (mm) | 5.75 |
| HFOV (°) | 20.8 |

Figures 2A, 2B:
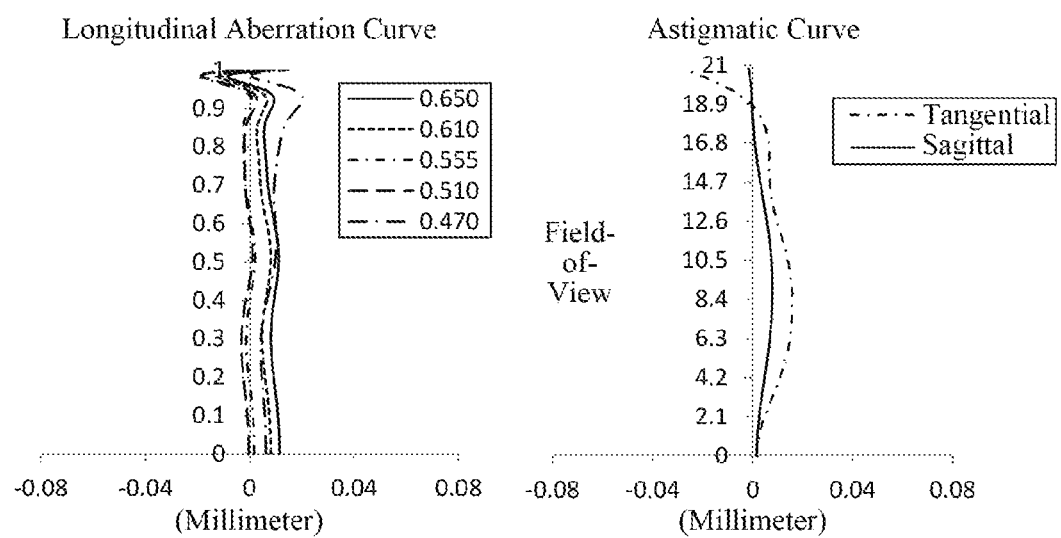
FIGS. 2A to 2D illustrate a longitudinal aberration curve, an astigmatic curve, a distortion curve and a lateral color curve of the optical imaging lens group of the Example 1, respectively.

FIG. 2A illustrates a longitudinal aberration curve of the optical imaging lens group according to example 1, representing deviations of focal points converged by light of different wavelengths after passing through the lens assembly. FIG. 2B illustrates an astigmatic curve of the optical

TABLE 2

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −9.7940E−02 | 7.2955E−02 | −4.8220E−02 | 2.3231E−02 | −7.5900E−03 |

Figure 2C:
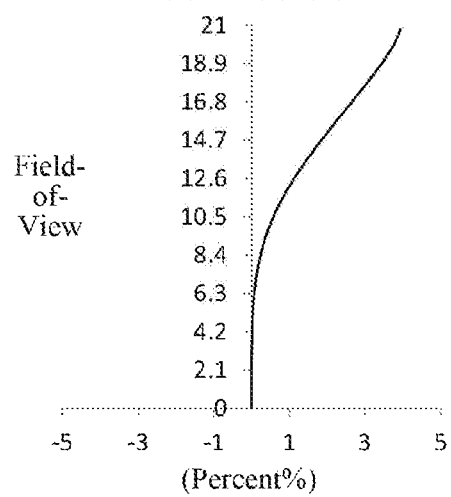
Figure 2D:
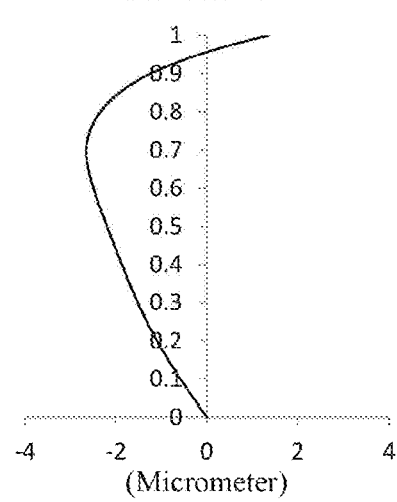

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 1.5770E−03 | −1.9000E−04 | 1.0500E−05 | −9.2000E−08 | imaging lens group according to example 1, representing a curvature of a tangential plane and a curvature of a sagittal plane. FIG. 2C illustrates a distortion curve of the optical imaging lens group according to example 1, representing amounts of distortion at different image heights. FIG. 2D illustrates a lateral color curve of the optical imaging lens group according to example 1, representing deviations of different image heights on an imaging plane after light passes through the lens assembly. It can be seen from FIG. 2A to FIG. 2D that the optical imaging lens group provided in example 1 may achieve good image quality.

EXAMPLE 2

Figure 3:
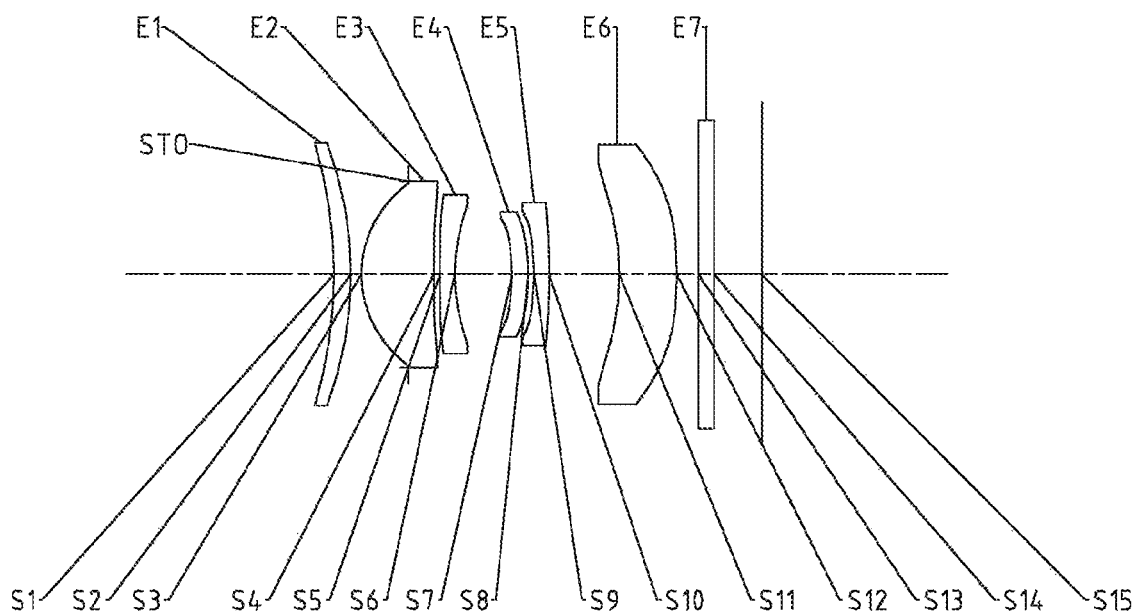
FIG. 3 illustrates a schematic structural view of an optical imaging lens group according to Example 2 of the present disclosure.

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a positive refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 4 shows surface type, radius of curvature, thickness, material and conic coefficient of each lens of the optical imaging lens group in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows effective focal lengths f1 to f6 of respective lens, a total effective focal length f of the optical imaging lens group, a total track length TTL and half of a maximal field-of-view HFOV in example 2.

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | −6.1985 | 0.2300 | 1.55 | 56.1 | |
| S2 | spherical | −4.9885 | 0.7700 | | | |
| STO | spherical | infinite | −0.6316 | | | |
| S3 | aspheric | 1.4744 | 0.9781 | 1.55 | 56.1 | −0.2788 |
| S4 | aspheric | 1000.0000 | 0.0792 | | | −99.0000 |
| S5 | aspheric | 15.7870 | 0.2008 | 1.66 | 21.5 | 88.1047 |
| S6 | aspheric | 2.3545 | 0.7719 | | | −11.4622 |
| S7 | aspheric | −3.0483 | 0.2157 | 1.65 | 23.5 | −15.2200 |
| S8 | aspheric | −2.9385 | 0.0816 | | | −90.5994 |
| S9 | aspheric | −4.6321 | 0.2000 | 1.55 | 56.1 | −32.4972 |
| S10 | aspheric | −73.9030 | 0.9440 | | | 99.0000 |
| S11 | aspheric | −5.0528 | 0.7755 | 1.65 | 23.5 | −86.7239 |
| S12 | aspheric | −6.8151 | 0.2894 | | | 4.4489 |
| S13 | spherical | infinite | 0.2100 | 1.52 | 64.2 | |
| S14 | spherical | infinite | 0.6453 | | | |
| S15 | spherical | infinite | | | | |

TABLE 5

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |

TABLE 5-continued

| | | | | |
|---|---|---|---|---|
| S11 | −2.0529E−01 | 2.9671E−01 | −3.5643E−01 | 3.2706E−01 | −2.0614E−01 |
| S12 | −9.7360E−02 | 7.2309E−02 | −4.7660E−02 | 2.2889E−02 | −7.4500E−03 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 1.5450E−03 | −1.9000E−04 | 1.0200E−05 | −8.9000E−08 |

TABLE 6

| | |
|---|---|
| f1 (mm) | 43.87 |
| f2 (mm) | 2.70 |
| f3 (mm) | −4.24 |
| f4 (mm) | 71.49 |
| f5 (mm) | −9.06 |
| f6 (mm) | −36.63 |
| f (mm) | 5.80 |
| TTL (mm) | 5.76 |
| HFOV (°) | 20.9 |

Figure 4A:
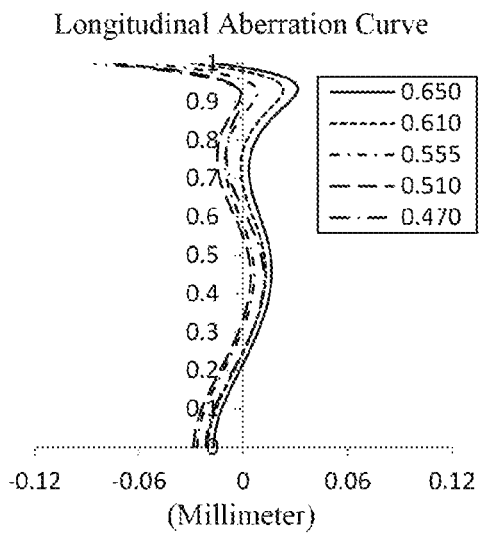
FIGS. 4A to 4D illustrate a longitudinal aberration curve, an astigmatic curve, a distortion curve and a lateral color curve of the optical imaging lens group of the Example 2, respectively.
Figure 4B:
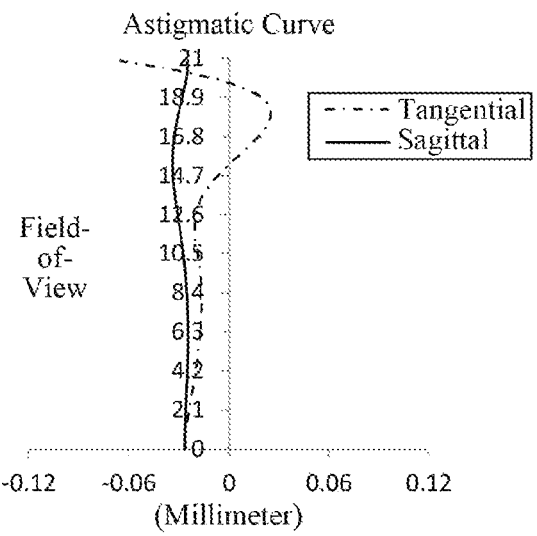
Figure 4C:
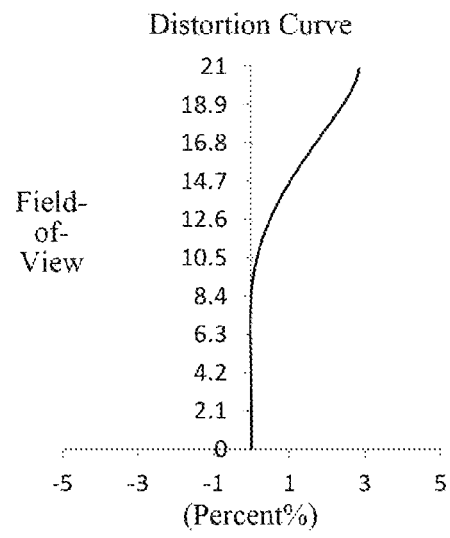
Figure 4D:
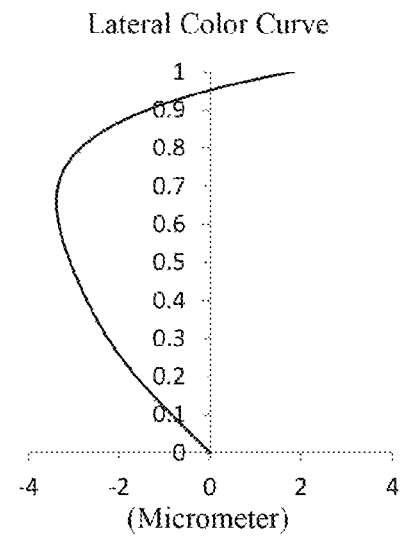

FIG. 4A illustrates a longitudinal aberration curve of the optical imaging lens group according to example 2, representing deviations of focal points converged by light of different wavelengths after passing through the lens assembly. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion at different image heights. FIG. 4D illustrates a lateral color curve of the optical imaging lens group according to example 2, representing deviations of different image heights on an imaging plane after light passes through the lens assembly. It can be seen from FIG. 4A to FIG. 4D that the optical imaging lens group provided in example 2 may achieve good image quality.

EXAMPLE 3

Figure 5:
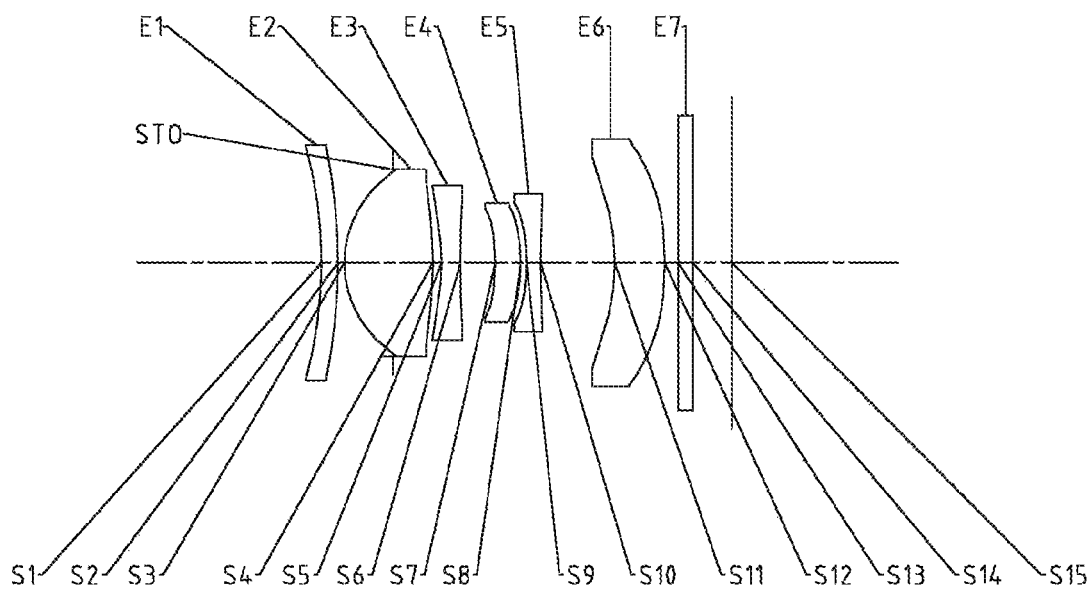
FIG. 5 illustrates a schematic structural view of an optical imaging lens group according to Example 3 of the present disclosure.

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a convex surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 7 shows surface type, radius of curvature, thickness, material and conic coefficient of each lens of the optical imaging lens group in example 3, wherein the units for the radius of curvature and the thickness are millimeter (mm). Table 8 shows high-order coefficients applicable to each aspheric surface in example 3, wherein the surface shape of each aspheric surface may be defined by the formula (1) given in the above example 1. Table 9 shows effective focal lengths f1 to f6 of respective lens, a total effective focal length f of the optical imaging lens group, a total track length TTL and half of a maximal field-of-view HFOV in example 3.

TABLE 7

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| S1 | spherical | −6.1985 | 0.2300 | 1.55 | 56.1 | |
| S2 | spherical | −8.1353 | 0.7700 | | | |
| STO | spherical | infinite | −0.6803 | | | |
| S3 | aspheric | 1.4902 | 1.2456 | 1.55 | 56.1 | −0.3575 |

TABLE 7-continued

| Surface number | Surface type | Radius of curvature | Thickness | Material Refractive index | Abbe number | Conic coefficient |
|---|---|---|---|---|---|---|
| S4 | aspheric | −5.1832 | 0.1216 | | | 7.0130 |
| S5 | aspheric | −2.6554 | 0.2644 | 1.66 | 21.5 | −20.3897 |
| S6 | aspheric | −1000.0000 | 0.4881 | | | −99.0000 |
| S7 | aspheric | −3.2594 | 0.3590 | 1.65 | 23.5 | −21.2996 |
| S8 | aspheric | −2.2230 | 0.0782 | | | −46.8159 |
| S9 | aspheric | −4.4298 | 0.2004 | 1.55 | 56.1 | 4.5029 |
| S10 | aspheric | 4.7236 | 1.0390 | | | −99.0000 |
| S11 | aspheric | −3.6180 | 0.7031 | 1.65 | 23.5 | −52.2606 |
| S12 | aspheric | −5.5412 | 0.1874 | | | 0.1132 |
| S13 | spherical | infinite | 0.2100 | 1.52 | 64.2 | |
| S14 | spherical | infinite | 0.5434 | | | |
| S15 | spherical | infinite | | | | |

TABLE 8

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −6.6993E−02 | 4.1273E−02 | −2.2560E−02 | 8.9900E−03 | −2.4300E−03 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 4.1800E−04 | −4.2000E−05 | 1.9000E−06 | −1.4000E−08 |

TABLE 9

| | |
|---|---|
| f1 (mm) | −49.78 |
| f2 (mm) | 2.27 |
| f3 (mm) | −4.06 |
| f4 (mm) | 9.55 |
| f5 (mm) | −4.16 |
| f6 (mm) | −18.88 |
| f (mm) | 5.79 |
| TTL (mm) | 5.76 |
| HFOV (°) | 21.0 |

Figures 6A, 6B:
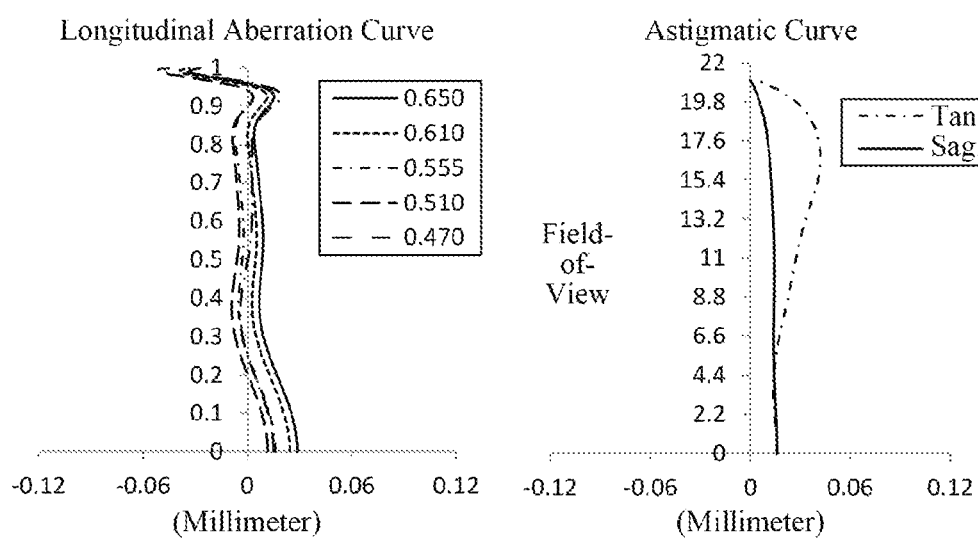
FIGS. 6A to 6D illustrate a longitudinal aberration curve, an astigmatic curve, a distortion curve and a lateral color curve of the optical imaging lens group of the Example 3, respectively.
Figures 6C, 6D:
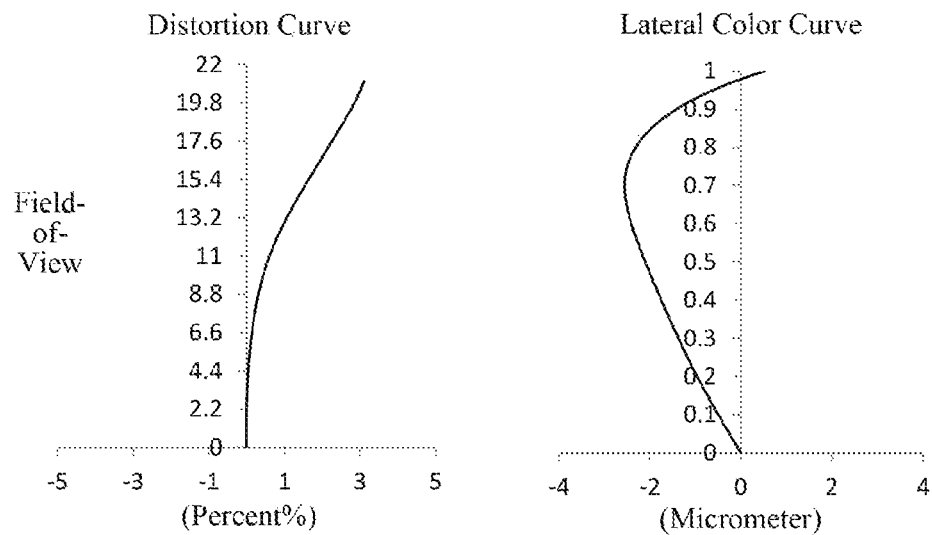

FIG. 6A illustrates a longitudinal aberration curve of the optical imaging lens group according to example 3, representing deviations of focal points converged by light of different wavelengths after passing through the lens assembly. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion at different image heights. FIG. 6D illustrates a lateral color curve of the optical imaging lens group according to example 3, representing deviations of different image heights on an imaging plane after light passes through the lens assembly. It can be seen from FIG. 6A to FIG. 6D that the optical imaging lens group provided in example 3 may achieve good image quality.

EXAMPLE 4

Figure 7:
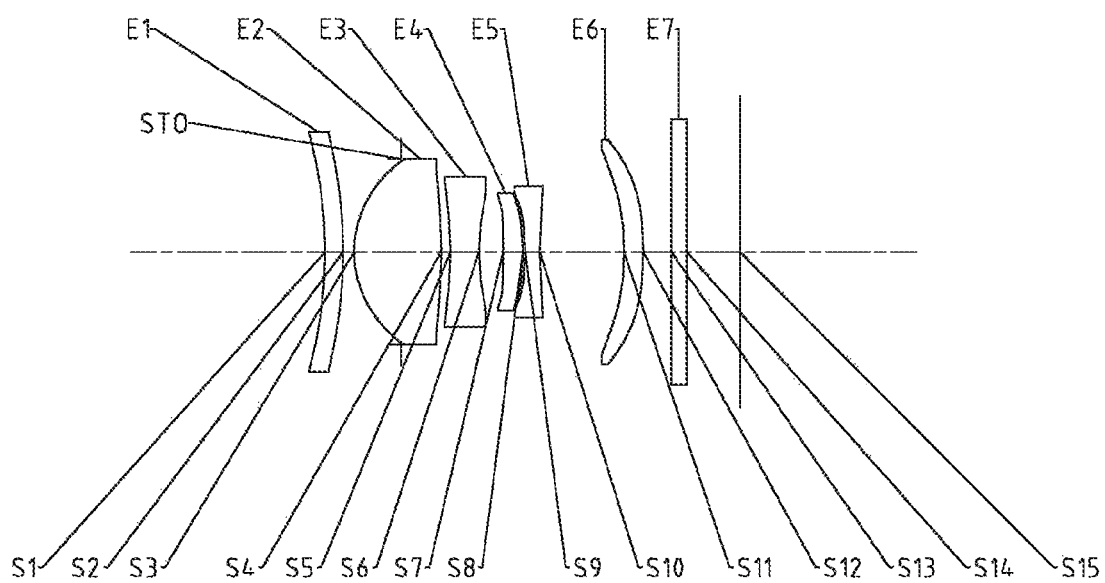
FIG. 7 illustrates a schematic structural view of an optical imaging lens group according to Example 4 of the present disclosure.

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 10 shows surface type, radius of curvature, thickness, material and conic coefficient of each lens of the optical imaging lens group in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows effective focal lengths f1 to f6 of respective lens, a total effective focal length f of the optical imaging lens group, a total track length TTL and half of a maximal field-of-view HFOV in example 4.

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | −6.1985 | 0.2500 | 1.55 | 56.1 | |
| S2 | spherical | −6.7490 | 0.8000 | | | |
| STO | spherical | infinite | −0.6494 | | | |
| S3 | aspheric | 1.5075 | 1.2097 | 1.55 | 56.1 | −0.3105 |
| S4 | aspheric | −7.4652 | 0.1295 | | | 28.6407 |
| S5 | aspheric | −5.2482 | 0.3939 | 1.66 | 21.5 | −19.5614 |
| S6 | aspheric | 2.8805 | 0.3359 | | | −32.8110 |
| S7 | aspheric | 2497.0550 | 0.2757 | 1.65 | 23.5 | −99.0000 |
| S8 | aspheric | −3.0694 | 0.0319 | | | −99.0000 |
| S9 | aspheric | −4.1663 | 0.2000 | 1.55 | 56.1 | −10.1092 |
| S10 | aspheric | 4.7402 | 1.1695 | | | −19.9206 |
| S11 | aspheric | −6.6233 | 0.2653 | 1.65 | 23.5 | −4.0722 |
| S12 | aspheric | −9.0743 | 0.3910 | | | −24.1081 |
| S13 | spherical | infinite | 0.2100 | 1.52 | 64.2 | |
| S14 | spherical | infinite | 0.7469 | | | |
| S15 | spherical | infinite | | | | |

TABLE 11

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −1.9985E−01 | 2.1266E−01 | −2.0080E−01 | 1.3818E−01 | −6.4470E−02 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 1.9144E−02 | −3.2900E−03 | 2.6000E−04 | −3.2000E−06 |

TABLE 12

| | |
|---|---|
| f1 (mm) | −165.76 |
| f2 (mm) | 2.41 |
| f3 (mm) | −2.78 |
| f4 (mm) | 4.76 |
| f5 (mm) | −4.03 |
| f6 (mm) | −39.73 |
| f (mm) | 5.78 |
| TTL (mm) | 5.76 |
| HFOV (°) | 19.7 |

Figure 8A:
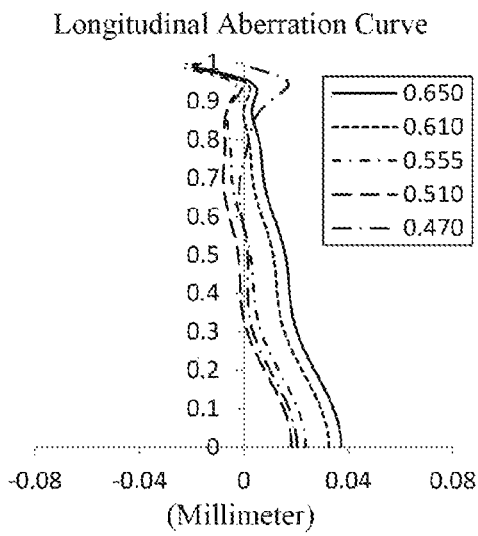
FIGS. 8A to 8D illustrate a longitudinal aberration curve, an astigmatic curve, a distortion curve and a lateral color curve of the optical imaging lens group of the Example 4, respectively.
Figure 8B:
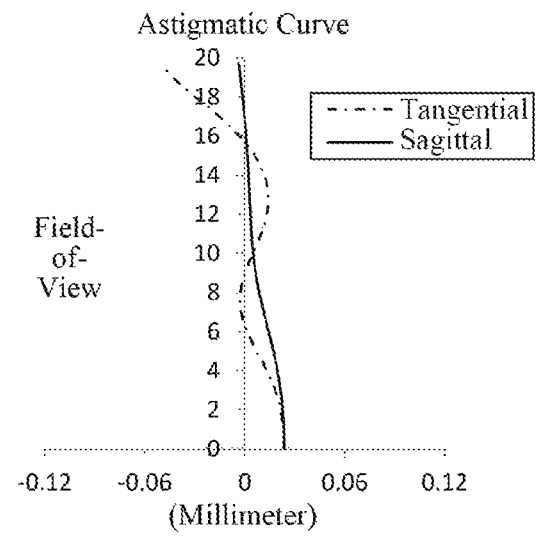
Figure 8C:
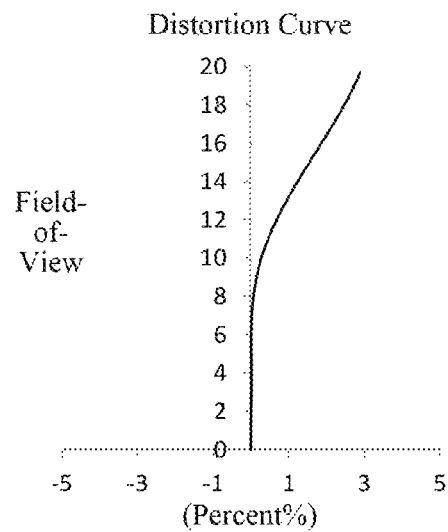
Figure 8D:
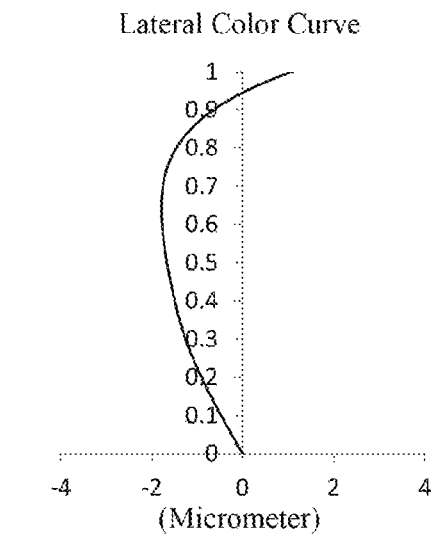

FIG. 8A illustrates a longitudinal aberration curve of the optical imaging lens group according to example 4, representing deviations of focal points converged by light of different wavelengths after passing through the lens assembly. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion at different image heights. FIG. 8D illustrates a lateral color curve of the optical imaging lens group according to example 4, representing deviations of different image heights on an imaging plane after light passes through the lens assembly. It can be seen from FIG. 8A to FIG. 8D that the optical imaging lens group provided in example 4 may achieve good image quality.

EXAMPLE 5

Figure 9:
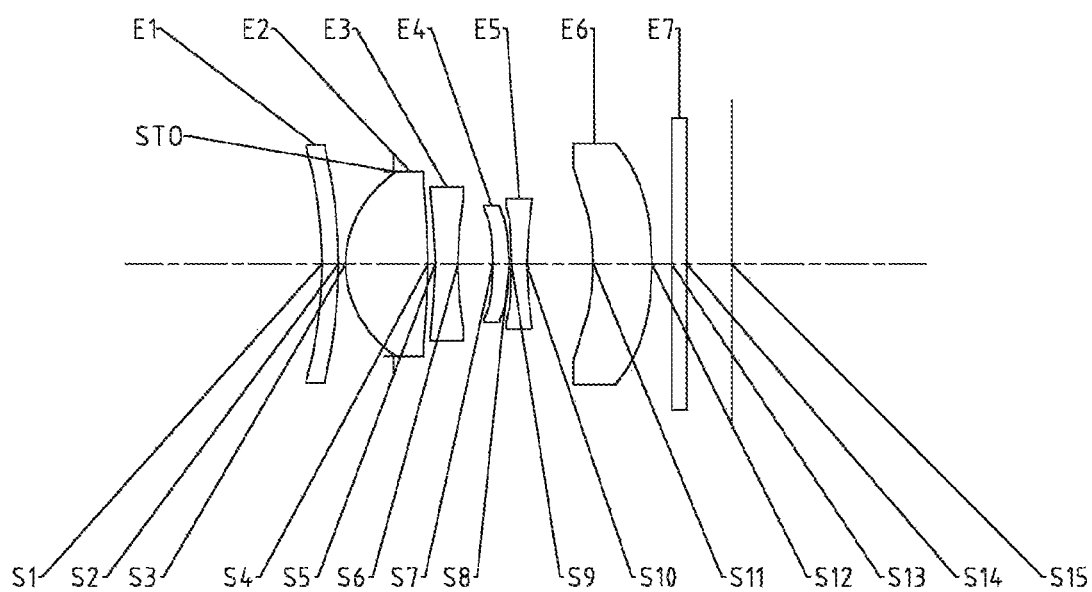
FIG. 9 illustrates a schematic structural view of an optical imaging lens group according to Example 5 of the present disclosure.

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 13 shows surface type, radius of curvature, thickness, material and conic coefficient of each lens of the optical imaging lens group in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows effective focal lengths f1 to f6 of respective lens, a total effective focal length f of the optical imaging lens group, a total track length TTL and half of a maximal field-of-view HFOV in example 5.

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | −6.1985 | 0.2300 | 1.55 | 56.1 | |
| S2 | spherical | −7.1630 | 0.7700 | | | |
| STO | spherical | infinite | −0.6716 | | | |
| S3 | aspheric | 1.4834 | 1.1578 | 1.55 | 56.1 | −0.3268 |
| S4 | aspheric | −6.7811 | 0.1046 | | | 14.3705 |
| S5 | aspheric | −4.9868 | 0.3152 | 1.66 | 21.5 | −42.5770 |
| S6 | aspheric | 4.8564 | 0.4946 | | | −99.0000 |
| S7 | aspheric | −4.8746 | 0.2275 | 1.65 | 23.5 | −0.4953 |
| S8 | aspheric | −3.0688 | 0.0300 | | | −99.0000 |
| S9 | aspheric | 1000.0000 | 0.2141 | 1.55 | 56.1 | −99.0000 |
| S10 | aspheric | 2.9613 | 0.9361 | | | −13.7187 |
| S11 | aspheric | −3.4471 | 0.8232 | 1.65 | 23.5 | −54.5961 |
| S12 | aspheric | −5.0081 | 0.2772 | | | 5.4025 |
| S13 | spherical | infinite | 0.2100 | 1.52 | 64.2 | |
| S14 | spherical | infinite | 0.6332 | | | |
| S15 | spherical | infinite | | | | |

TABLE 14

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |

TABLE 14-continued

| | | | | | |
|---|---|---|---|---|---|
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −3.9160E−02 | 1.8444E−02 | −7.7100E−03 | 2.3480E−03 | −4.8000E−04 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 6.3700E−05 | −1.8000E−06 | 1.7000E−07 | −9.3000E−10 |

TABLE 15

| | |
|---|---|
| f1 (mm) | −92.07 |
| f2 (mm) | 2.35 |
| f3 (mm) | −3.70 |
| f4 (mm) | 12.25 |
| f5 (mm) | −5.44 |
| f6 (mm) | −21.63 |
| f (mm) | 5.78 |
| TTL (mm) | 5.75 |
| HFOV (°) | 21.1 |

Figure 10A:
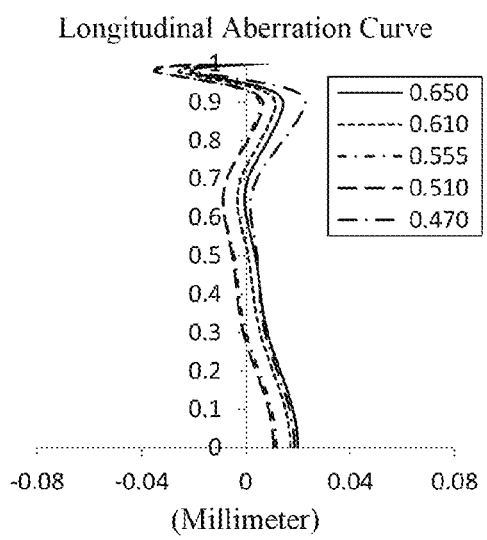
FIGS. 10A to 10D illustrate a longitudinal aberration curve, an astigmatic curve, a distortion curve and a lateral color curve of the optical imaging lens group of the Example 5, respectively.
Figure 10B:
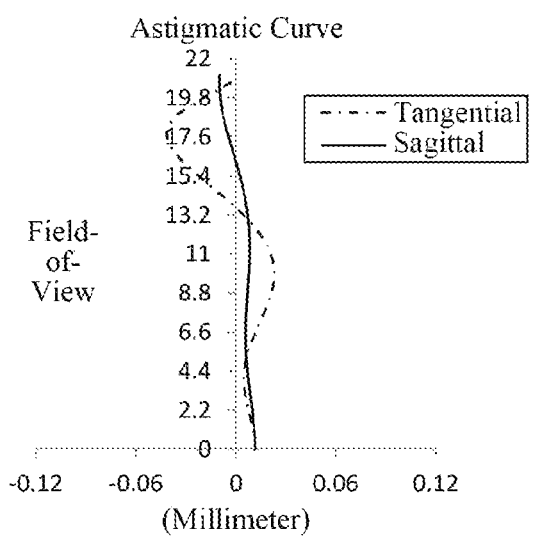
Figures 10C, 10D:
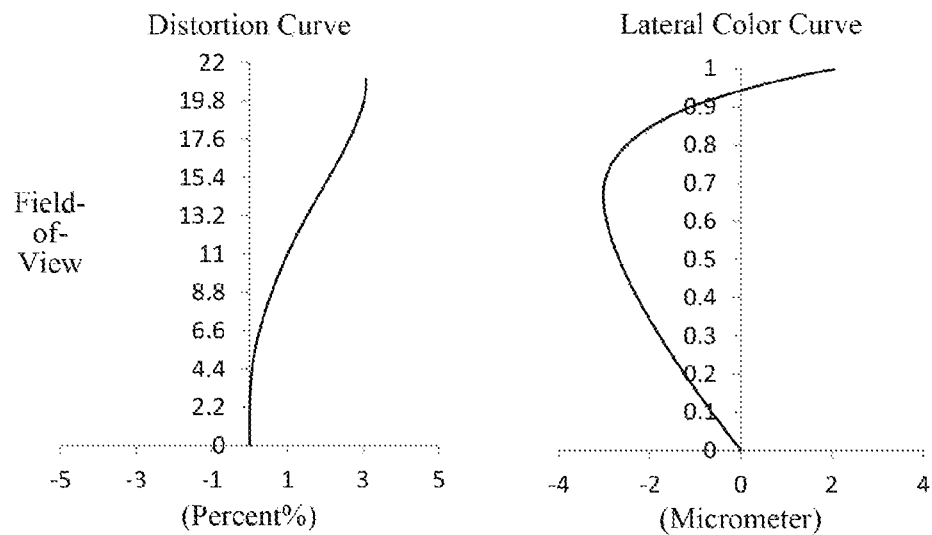

FIG. 10A illustrates a longitudinal aberration curve of the optical imaging lens group according to example 5, representing deviations of focal points converged by light of different wavelengths after passing through the lens assembly. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion at different image heights. FIG. 10D illustrates a lateral color curve of the optical imaging lens group according to example 5, representing deviations of different image heights on an imaging plane after light passes through the lens assembly. It can be seen from FIG. 10A to FIG. 10D that the optical imaging lens group provided in example 5 may achieve good image quality.

EXAMPLE 6

Figure 11:
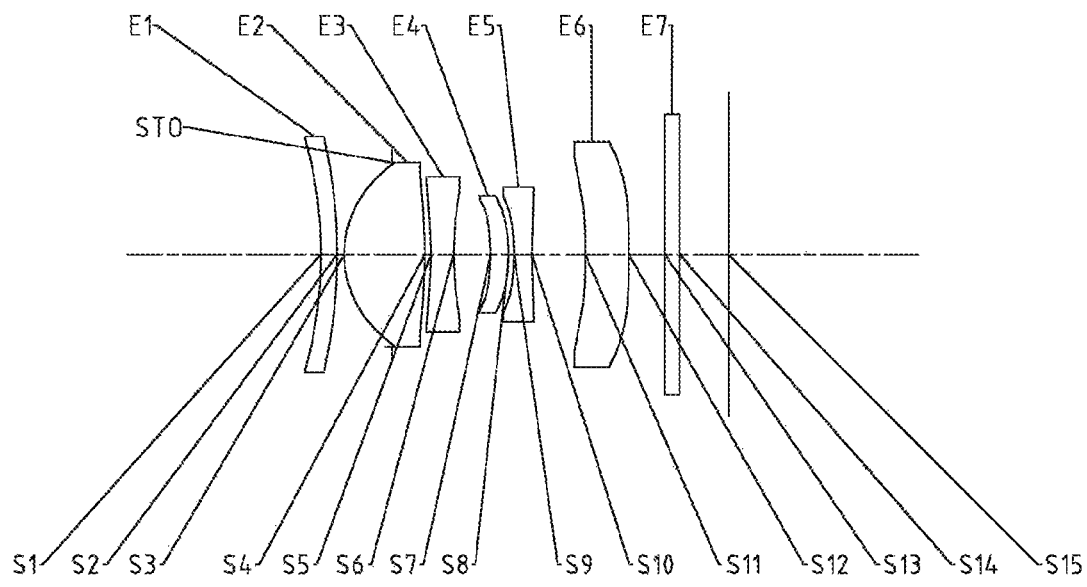
FIG. 11 illustrates a schematic structural view of an optical imaging lens group according to Example 6 of the present disclosure.

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 16 shows surface type, radius of curvature, thickness, material and conic coefficient of each lens of the optical imaging lens group in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows effective focal lengths f1 to f6 of respective lens, a total effective focal length f of the optical imaging lens group, a total track length TTL and half of a maximal field-of-view HFOV in example 6.

TABLE 16

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| S1 | spherical | −6.1985 | 0.2300 | 1.55 | 56.1 | |
| S2 | spherical | −7.4734 | 0.7700 | | | |
| STO | spherical | infinite | −0.6737 | | | |

TABLE 16-continued

| Surface number | Surface type | Radius of curvature | Thickness | Material Refractive index | Abbe number | Conic coefficient |
|---|---|---|---|---|---|---|
| S3 | aspheric | 1.4922 | 1.1407 | 1.55 | 56.1 | −0.3167 |
| S4 | aspheric | −6.0197 | 0.0879 | | | 6.2114 |
| S5 | aspheric | −5.6681 | 0.3152 | 1.66 | 21.5 | −41.0926 |
| S6 | aspheric | 4.3931 | 0.5250 | | | −73.1061 |
| S7 | aspheric | −3.2347 | 0.2560 | 1.65 | 23.5 | −14.9791 |
| S8 | aspheric | −2.0155 | 0.0734 | | | −33.4973 |
| S9 | aspheric | −4.1494 | 0.2512 | 1.55 | 56.1 | −16.4167 |
| S10 | aspheric | 3.9581 | 0.7530 | | | −99.0000 |
| S11 | aspheric | −500.0000 | 0.6154 | 1.65 | 23.5 | 99.0000 |
| S12 | aspheric | 30.0909 | 0.5061 | | | −99.0000 |
| S13 | spherical | infinite | 0.2100 | 1.52 | 64.2 | |
| S14 | spherical | infinite | 0.6916 | | | |
| S15 | spherical | infinite | | | | |

TABLE 17

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −1.4940E−01 | 1.3745E−01 | −1.1222E−01 | 6.6765E−02 | −2.6930E−02 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 6.9150E−03 | −1.0300E−03 | 7.0300E−05 | −7.6000E−07 |

TABLE 18

| | |
|---|---|
| f1 (mm) | −71.08 |
| f2 (mm) | 2.31 |
| f3 (mm) | −3.72 |
| f4 (mm) | 7.67 |
| f5 (mm) | −3.67 |
| f6 (mm) | −44.01 |
| f (mm) | 5.78 |
| TTL (mm) | 5.75 |
| HFOV (°) | 21.1 |

Figure 12A:
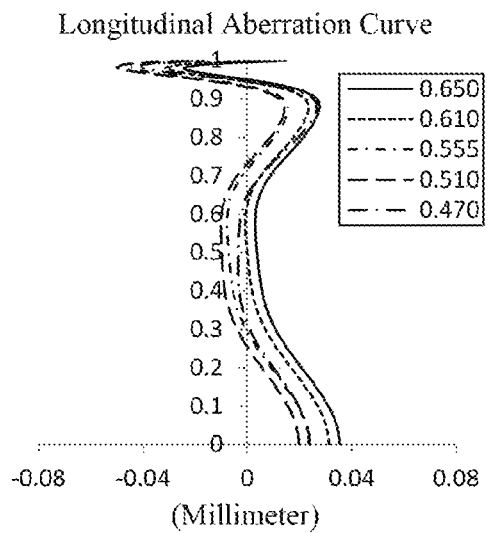
FIGS. 12A to 12D illustrate a longitudinal aberration curve, an astigmatic curve, a distortion curve and a lateral color curve of the optical imaging lens group of the Example 6, respectively.
Figure 12B:
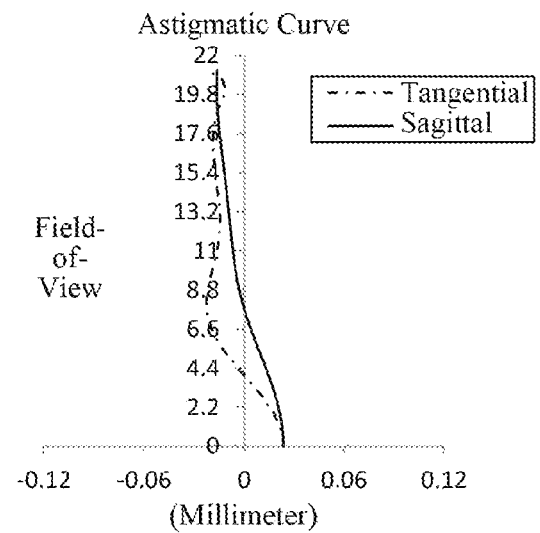
Figure 12C:
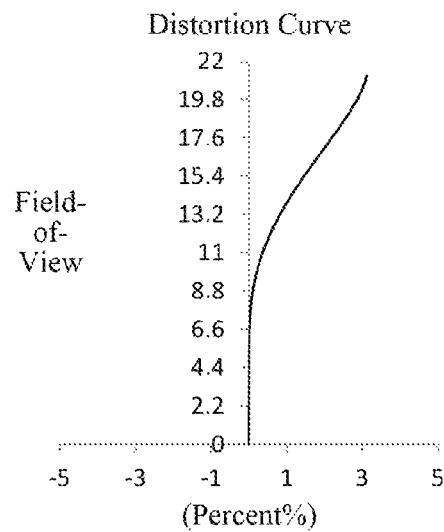
Figure 12D:
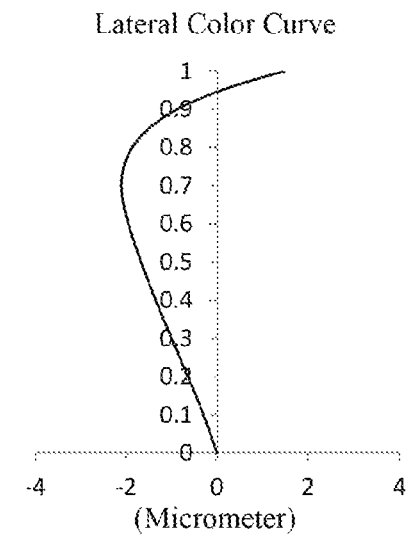

FIG. 12A illustrates a longitudinal aberration curve of the optical imaging lens group according to example 6, representing deviations of focal points converged by light of different wavelengths after passing through the lens assembly. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion at different image heights. FIG. 12D illustrates a lateral color curve of the optical imaging lens group according to example 6, representing deviations of different image heights on an imaging plane after light passes through the lens assembly. It can be seen from FIG. 12A to FIG. 12D that the optical imaging lens group provided in example 6 may achieve good image quality.

EXAMPLE 7

Figure 13:
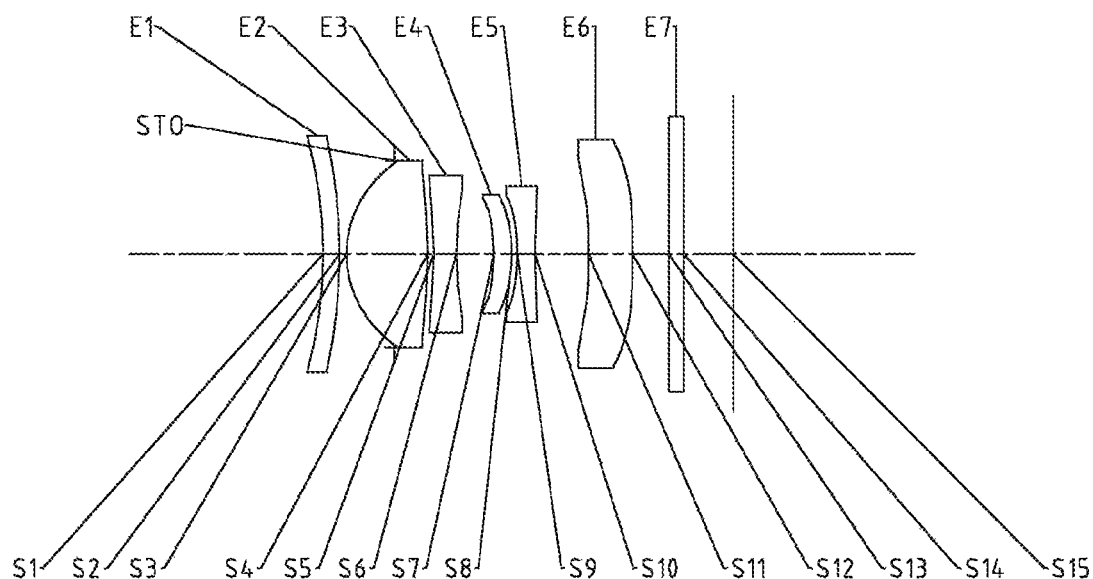
FIG. 13 illustrates a schematic structural view of an optical imaging lens group according to Example 7 of the present disclosure.

An optical imaging lens group according to example 7 of the present disclosure is described below with reference to FIG. 13 to FIG. 14D. FIG. 13 shows a schematic structural view of the optical imaging lens group according to example 7 of the present disclosure.

As shown in FIG. 13, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a negative refractive power. An object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the respective surfaces S1 to S14 and is finally imaged on the imaging plane S15.

Table 19 shows surface type, radius of curvature, thickness, material and conic coefficient of each lens of the optical imaging lens group in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows effective focal lengths f1 to f6 of respective lens, a total effective focal length f of the optical imaging lens group, a total track length TTL and half of a maximal field-of-view HFOV in example 7.

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | −6.1985 | 0.2300 | 1.55, | 56.1 | |
| S2 | spherical | −7.5036 | 0.7700 | | | |
| STO | spherical | infinite | −0.6741 | | | |
| S3 | aspheric | 1.4920 | 1.1403 | 1.55 | 56.1 | −0.3167 |
| S4 | aspheric | −5.9874 | 0.0865 | | | 5.9027 |
| S5 | aspheric | −5.7510 | 0.3144 | 1.66 | 21.5 | −41.0894 |
| S6 | aspheric | 4.3575 | 0.5280 | | | −71.7917 |
| S7 | aspheric | −3.1343 | 0.2530 | 1.65 | 23.5 | −14.5795 |
| S8 | aspheric | −1.9631 | 0.0731 | | | −31.8634 |
| S9 | aspheric | −4.1530 | 0.2493 | 1.55 | 56.1 | −16.6147 |
| S10 | aspheric | 3.8532 | 0.7503 | | | −99.0000 |
| S11 | aspheric | 1000.0000 | 0.6171 | 1.65 | 23.5 | −99.0000 |
| S12 | aspheric | 28.5412 | 0.5093 | | | −99.0000 |
| S13 | spherical | infinite | 0.2100 | 1.52 | 64.2 | |
| S14 | spherical | infinite | 0.6948 | | | |
| S15 | spherical | infinite | | | | |

TABLE 20

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9100E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E−01 | 1.9312E−01 | −1.3828E+00 |
| S11 | −2.0529E−01 | 2.9671E−01 | −3.5643E−01 | 3.2706E−01 | −2.0614E−01 |
| S12 | −1.4854E−01 | 1.3626E−01 | −1.1093E−01 | 6.5807E−02 | −2.6470E−02 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 6.7760E−03 | −1.0000E−03 | 6.8500E−05 | −7.3000E−07 |

TABLE 21

| | |
|---|---|
| f1 (mm) | −69.61 |
| f2 (mm) | 2.31 |
| f3 (mm) | −3.73 |
| f4 (mm) | 7.51 |
| f5 (mm) | −3.62 |
| f6 (mm) | −45.59 |
| f (mm) | 5.78 |
| TTL (mm) | 5.75 |
| HFOV (°) | 20.5 |

Figure 14A:
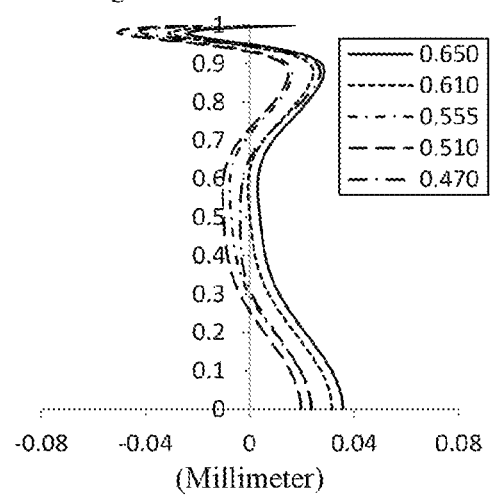
FIGS. 14A to 14D illustrate a longitudinal aberration curve, an astigmatic curve, a distortion curve and a lateral color curve of the optical imaging lens group of the Example 7, respectively.
Figure 14B:
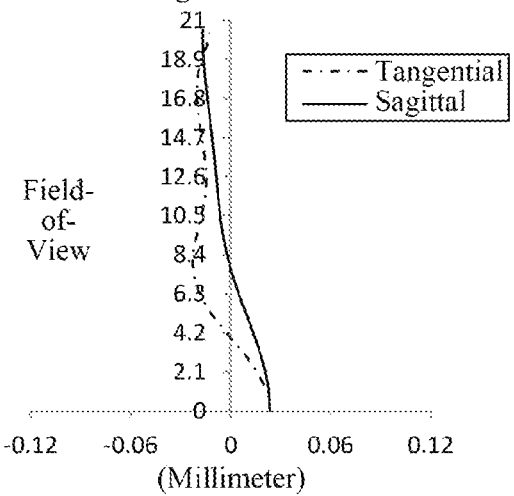
Figure 14C:
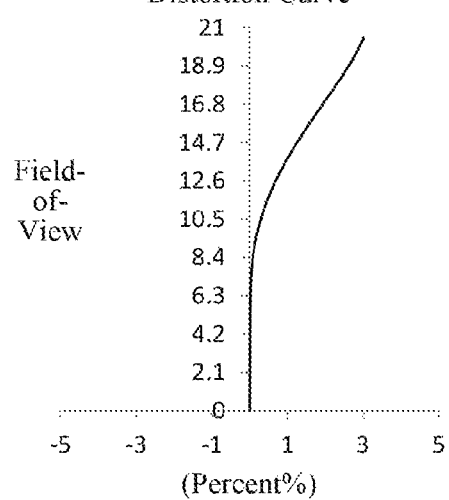
Figure 14D:
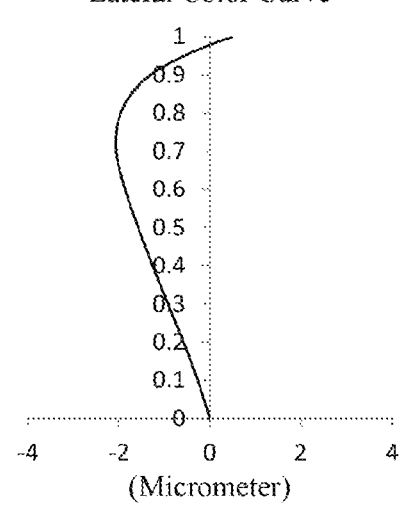

FIG. 14A illustrates a longitudinal aberration curve of the optical imaging lens group according to example 7, representing deviations of focal points converged by light of different wavelengths after passing through the lens assembly. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion at different image heights. FIG. 14D illustrates a lateral color curve of the optical imaging lens group according to example 7, representing deviations of different image heights on an imaging plane after light passes through the lens assembly. It can be seen from FIG. 14A to FIG. 14D that the optical imaging lens group provided in example 7 may achieve good image quality.

EXAMPLE 8

Figure 15:
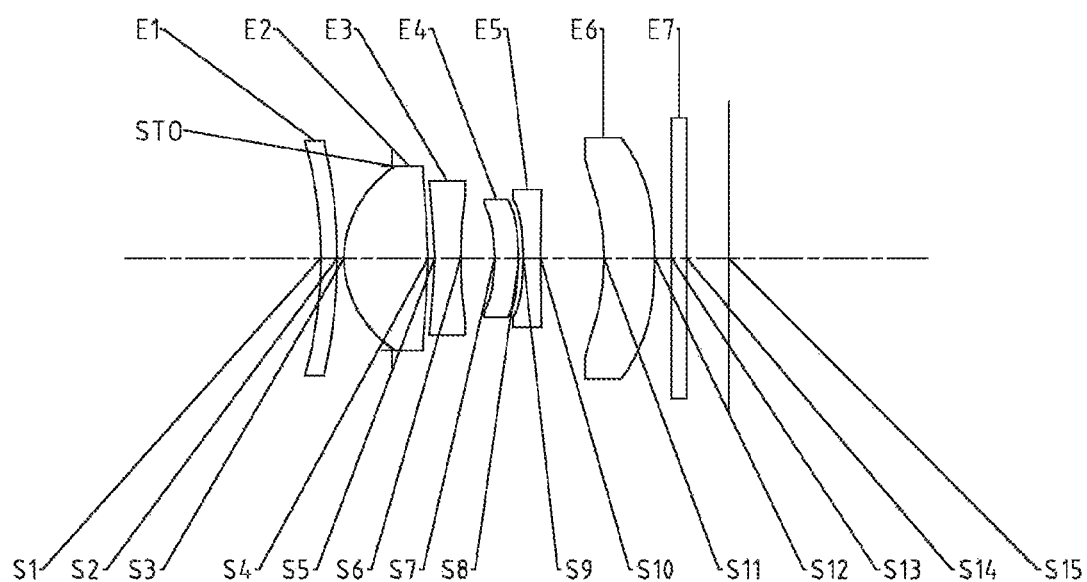
FIG. 15 illustrates a schematic structural view of an optical imaging lens group according to Example 8 of the present disclosure.

An optical imaging lens group according to example 8 of the present disclosure is described below with reference to FIG. 15 to FIG. 16D. FIG. 15 shows a schematic structural view of the optical imaging lens group according to example 8 of the present disclosure.

As shown in FIG. 15, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a negative refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 22 shows surface type, radius of curvature, thickness, material and conic coefficient of each lens of the optical imaging lens group in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows effective focal lengths f1 to f6 of respective lens, a total effective focal length f of the optical imaging lens group, a total track length TTL and half of a maximal field-of-view HFOV in example 8.

TABLE 22

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | spherical | −6.1985 | 0.2300 | 1.55 | 56.1 | |
| S2 | spherical | −7.4236 | 0.7700 | | | |
| STO | spherical | infinite | −0.6762 | | | |
| S3 | aspheric | 1.4744 | 1.1870 | 1.55 | 56.1 | −0.3541 |
| S4 | aspheric | −6.3037 | 0.0935 | | | 11.4296 |
| S5 | aspheric | −4.1131 | 0.3688 | 1.66 | 21.5 | −61.0165 |
| S6 | aspheric | 9.7089 | 0.4784 | | | −22.0884 |
| S7 | aspheric | −2.7718 | 0.3418 | 1.65 | 23.5 | −17.1679 |
| S8 | aspheric | −2.9183 | 0.0616 | | | −90.1958 |
| S9 | aspheric | −7.0142 | 0.2453 | 1.55 | 56.1 | 40.8676 |
| S10 | aspheric | 7.3935 | 0.8948 | | | −77.5251 |
| S11 | aspheric | −4.4079 | 0.7159 | 1.65 | 23.5 | −70.4030 |
| S12 | aspheric | −7.8289 | 0.2375 | | | 9.0873 |
| S13 | spherical | infinite | 0.2100 | 1.52 | 64.2 | |
| S14 | spherical | infinite | 0.5935 | | | |
| S15 | spherical | infinite | | | | |

TABLE 23

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |

TABLE 23-continued

| | | | | | |
|---|---|---|---|---|---|
| S6 | 2.0446E−02 | 8.5194E−02 | −8.1470E−02 | −2.4986E−01 | 6.6525E−01 |
| S7 | −1.4854E−01 | −1.9104E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −8.7019E−02 | 6.1099E−02 | −3.8070E−02 | 1.7286E−02 | −5.3200E−03 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 1.0430E−03 | −1.2000E−04 | 6.1800E−06 | −5.1000E−08 |

TABLE 24

| | |
|---|---|
| f1 (mm) | −73.69 |
| f2 (mm) | 2.31 |
| f3 (mm) | −4.36 |
| f4 (mm) | −1000.00 |
| f5 (mm) | −6.55 |
| f6 (mm) | −17.05 |
| f (mm) | 5.78 |
| TTL (mm) | 5.75 |
| HFOV (°) | 20.4 |

Figure 16A:
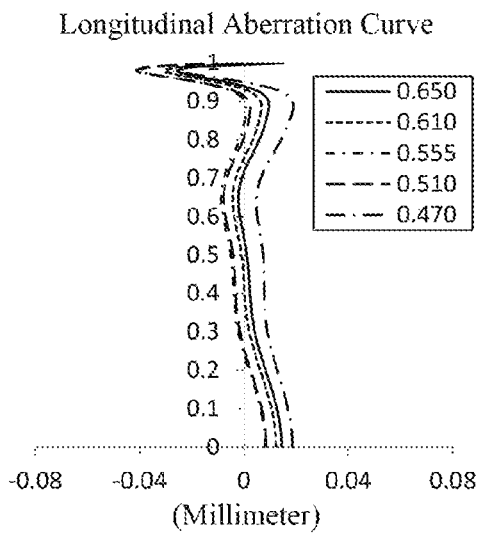
FIGS. 16A to 16D illustrate a longitudinal aberration curve, an astigmatic curve, a distortion curve and a lateral color curve of the optical imaging lens group of the Example 8, respectively.
Figure 16B:
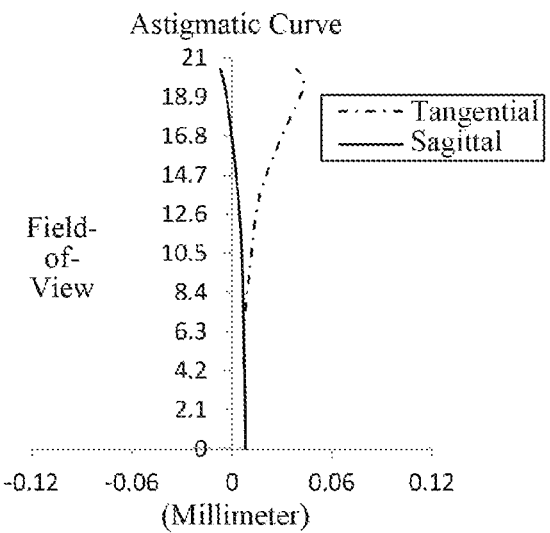
Figure 16C:
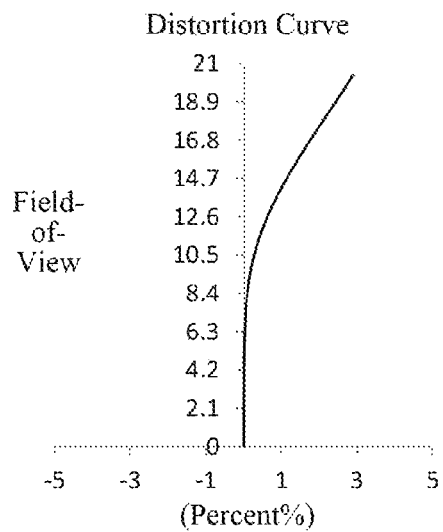
Figure 16D:
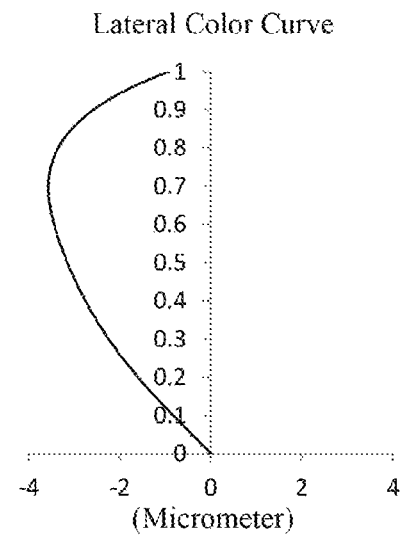

FIG. 16A illustrates a longitudinal aberration curve of the optical imaging lens group according to example 8, representing deviations of focal points converged by light of different wavelengths after passing through the lens assembly. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion at different image heights. FIG. 16D illustrates a lateral color curve of the optical imaging lens group according to example 8, representing deviations of different image heights on an imaging plane after light passes through the lens assembly. It can be seen from FIG. 16A to FIG. 16D that the optical imaging lens group provided in example 8 may achieve good image quality.

EXAMPLE 9

Figure 17:
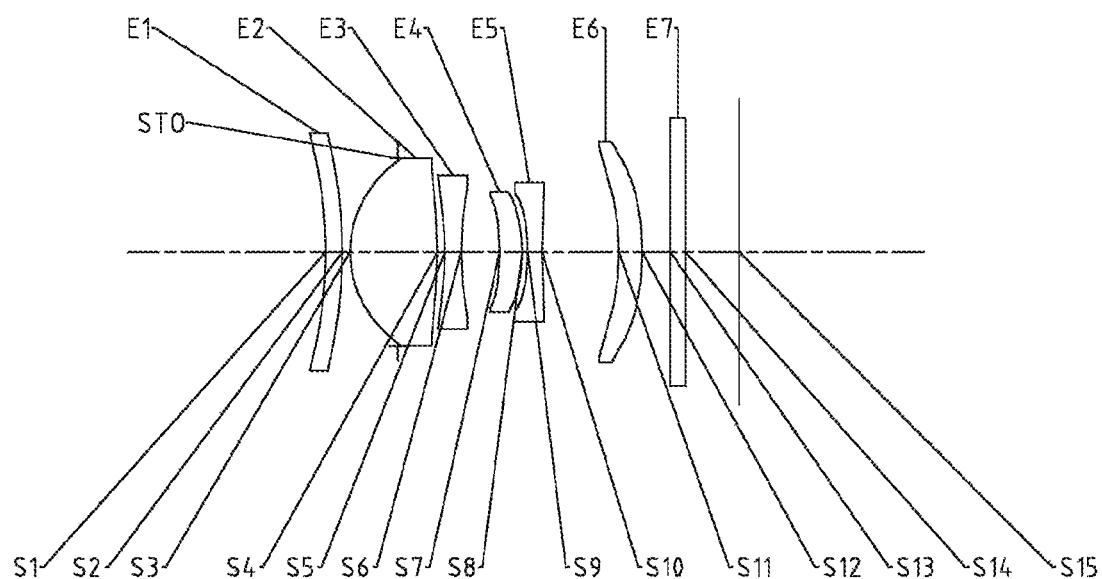
FIG. 17 illustrates a schematic structural view of an optical imaging lens group according to Example 9 of the present disclosure.

An optical imaging lens group according to example 9 of the present disclosure is described below with reference to FIG. 17 to FIG. 18D. FIG. 17 shows a schematic structural view of the optical imaging lens group according to example 9 of the present disclosure.

As shown in FIG. 17, the optical imaging lens group according to an exemplary embodiment of the present disclosure includes a first lens E1, a stop STO, a second lens E2, a third lens E3, a fourth lens E4, a fifth lens E5, a sixth lens E6, an optical filter E7 and an imaging plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a concave surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The optical filter E7 has an object-side surface S13 and an image-side surface S14. Light from an object sequentially passes through the respective surfaces S1 to S14 and is finally imaged on the imaging plane S15.

Table 25 shows surface type, radius of curvature, thickness, material and conic coefficient of each lens of the optical imaging lens group in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows effective focal lengths f1 to f6 of respective lens, a total effective focal length f of the optical imaging lens group, a total track length TTL and half of a maximal field-of-view HFOV in example 9.

TABLE 25

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| S1 | spherical | −6.1985 | 0.2300 | 1.55 | 56.1 | |
| S2 | spherical | −6.6963 | 0.7700 | | | |

TABLE 25-continued

| Surface number | Surface type | Radius of curvature | Thickness | Material Refractive index | Abbe number | Conic coefficient |
|---|---|---|---|---|---|---|
| STO | spherical | infinite | −0.6630 | | | |
| S3 | aspheric | 1.5051 | 1.2187 | 1.55 | 56.1 | −0.3255 |
| S4 | aspheric | −6.0065 | 0.1015 | | | 12.4577 |
| S5 | aspheric | −4.1974 | 0.2262 | 1.66 | 21.5 | −23.4583 |
| S6 | aspheric | 4.3946 | 0.5371 | | | −62.8576 |
| S7 | aspheric | −4.2120 | 0.3131 | 1.65 | 23.5 | −39.4152 |
| S8 | aspheric | −2.0722 | 0.0770 | | | −34.8451 |
| S9 | aspheric | −3.5683 | 0.2000 | 1.55 | 56.1 | −4.6720 |
| S10 | aspheric | 4.7067 | 1.0681 | | | −86.5970 |
| S11 | aspheric | −4.5170 | 0.3255 | 1.65 | 23.5 | −99.0000 |
| S12 | aspheric | −4.6411 | 0.3909 | | | 0.1269 |
| S13 | spherical | infinite | 0.2100 | 1.52 | 64.2 | |
| S14 | spherical | infinite | 0.7469 | | | |
| S15 | spherical | infinite | | | | |

TABLE 26

| Surface number | A4 | A6 | A8 | A10 | A12 |
|---|---|---|---|---|---|
| S3 | 8.2950E−03 | 4.1480E−03 | −5.6200E−03 | 1.6726E−02 | −1.9770E−02 |
| S4 | −3.0100E−03 | 1.2975E−01 | −1.9918E−01 | 1.5679E−01 | −6.2860E−02 |
| S5 | −1.0107E−01 | 3.6352E−01 | −6.1741E−01 | 6.2974E−01 | −3.7504E−01 |
| S6 | 2.0446E−02 | 8.5194E−02 | −8.1470E−02 | −2.4986E−01 | 6.6525E−01 |
| S7 | −1.4854E−01 | −1.9104E−02 | 7.9712E−01 | −5.6448E+00 | 1.8782E+01 |
| S8 | −5.9725E−01 | 3.2551E+00 | −1.4880E+01 | 5.4157E+01 | −1.4902E+02 |
| S9 | −4.6046E−01 | 1.8106E+00 | −4.5956E+00 | 6.7290E+00 | −7.3016E+00 |
| S10 | −2.5376E−01 | 7.8356E−01 | −1.5539E+00 | 1.9312E+00 | −1.3828E+00 |
| S11 | −2.0529E−01 | 2.9671E−01 | −3.5643E−01 | 3.2706E−01 | −2.0614E−01 |
| S12 | −7.1702E−02 | 4.5700E−02 | −2.5850E−02 | 1.0653E−02 | −2.9800E−03 |

| Surface number | A14 | A16 | A18 | A20 |
|---|---|---|---|---|
| S3 | 1.1831E−02 | −2.8800E−03 | 0.0000E+00 | 0.0000E+00 |
| S4 | 4.9310E−03 | 3.1230E−03 | 0.0000E+00 | 0.0000E+00 |
| S5 | 1.1554E−01 | −1.1430E−02 | 0.0000E+00 | 0.0000E+00 |
| S6 | −6.0008E−01 | 1.9440E−01 | 0.0000E+00 | 0.0000E+00 |
| S7 | −4.0569E+01 | 5.5723E+01 | −4.3031E+01 | 1.3774E+01 |
| S8 | 2.7876E+02 | −3.2751E+02 | 2.1725E+02 | −6.2199E+01 |
| S9 | 6.1585E+00 | −2.8038E+00 | 0.0000E+00 | 0.0000E+00 |
| S10 | 5.0621E−01 | −7.0540E−02 | 0.0000E+00 | 0.0000E+00 |
| S11 | 8.5622E−02 | −2.2310E−02 | 3.2910E−03 | −2.1000E−04 |
| S12 | 5.3000E−04 | −5.4000E−05 | 2.5800E−06 | −1.9000E−08 |

TABLE 27

| | |
|---|---|
| f1 (mm) | −182.48 |
| f2 (mm) | 2.34 |
| f3 (mm) | −3.24 |
| f4 (mm) | 5.98 |
| f5 (mm) | −3.69 |
| f6 (mm) | 9465.42 |
| f (mm) | 5.83 |
| TTL (mm) | 5.75 |
| HFOV (°) | 19.5 |

Figure 18A:
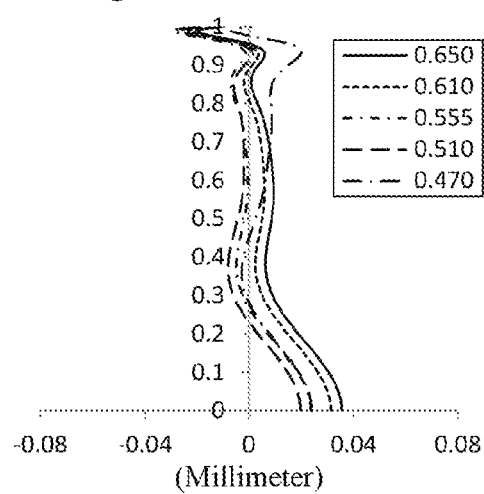
FIGS. 18A to 18D illustrate a longitudinal aberration curve, an astigmatic curve, a distortion curve and a lateral color curve of the optical imaging lens group of the Example 9, respectively.
Figure 18B:
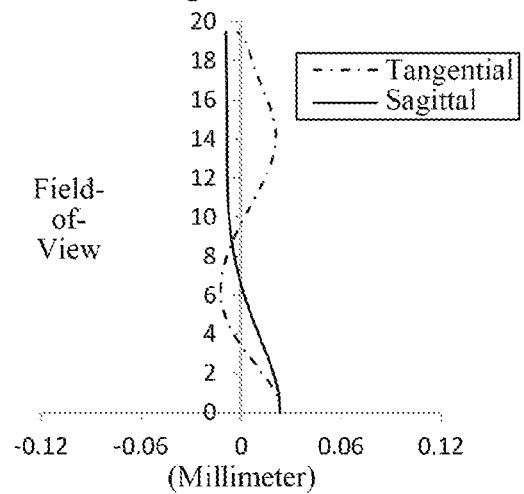
Figure 18C:
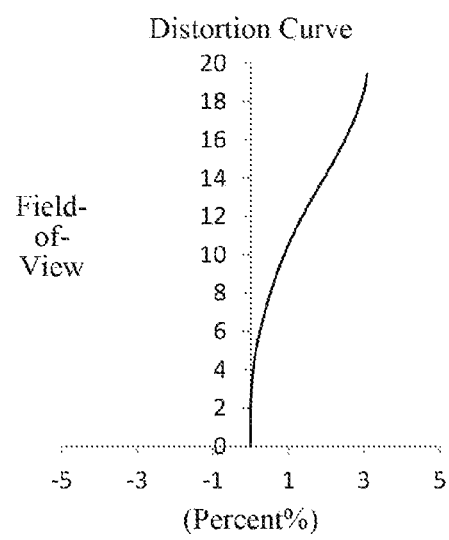
Figure 18D:
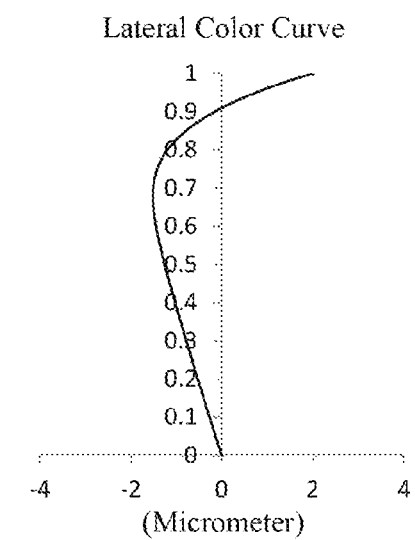

FIG. 18A illustrates a longitudinal aberration curve of the optical imaging lens group according to example 9, representing deviations of focal points converged by light of different wavelengths after passing through the lens assembly. FIG. 18B illustrates an astigmatic curve of the optical imaging lens group according to example 9, representing a curvature of a tangential plane and a curvature of a sagittal plane. FIG. 18C illustrates a distortion curve of the optical imaging lens group according to example 9, representing amounts of distortion at different image heights. FIG. 18D illustrates a lateral color curve of the optical imaging lens group according to example 9, representing deviations of different image heights on an imaging plane after light passes through the lens assembly. It can be seen from FIG. 18A to FIG. 18D that the optical imaging lens group provided in example 9 may achieve good image quality.

In view of the above, examples 1 to 9 respectively satisfy the relationship shown in Table 28.

TABLE 28

| | Example | | | | | | | | |
|---|---|---|---|---|---|---|---|---|---|
| Condition | 1 | 2 | 3 | 4 | 5 | 6 | 7 | 8 | 9 |
| tan(HFOV) | 0.38 | 0.38 | 0.38 | 0.36 | 0.39 | 0.39 | 0.37 | 0.37 | 0.35 |
| f2/R3 | 1.58 | 1.83 | 1.52 | 1.60 | 1.58 | 1.55 | 1.55 | 1.57 | 1.55 |

TABLE 28-continued

| Condition | Example | | | | | | | | |
|---|---|---|---|---|---|---|---|---|---|
| | 1 | 2 | 3 | 4 | 5 | 6 | 7 | 8 | 9 |
| f/f3 | −1.68 | −1.37 | −1.43 | −2.08 | −1.56 | −1.55 | −1.55 | −1.33 | −1.80 |
| f/f5 | −1.28 | −0.64 | −1.39 | −1.43 | −1.06 | −1.57 | −1.60 | −0.88 | −1.58 |
| R1/R8 | 2.35 | 2.11 | 2.79 | 2.02 | 2.02 | 3.08 | 3.16 | 2.12 | 2.99 |
| R2/f | −1.11 | −0.86 | −1.40 | −1.17 | −1.24 | −1.29 | −1.30 | −1.28 | −1.15 |
| f/f23 | 1.38 | 1.21 | 1.62 | 1.15 | 1.47 | 1.49 | 1.50 | 1.64 | 1.34 |
| f/f45 | −0.61 | −0.58 | −0.83 | −0.19 | −0.59 | −0.84 | −0.84 | −0.93 | −0.62 |
| CT6/CT2 | 0.60 | 0.79 | 0.56 | 0.22 | 0.71 | 0.54 | 0.54 | 0.60 | 0.27 |
| T34/T56 | 0.49 | 0.82 | 0.47 | 0.29 | 0.53 | 0.70 | 0.70 | 0.53 | 0.50 |
| |f/f1| | 0.02 | 0.13 | 0.12 | 0.03 | 0.06 | 0.08 | 0.08 | 0.08 | 0.03 |
| CT1/T12 | 2.10 | 1.66 | 2.56 | 1.66 | 2.34 | 2.39 | 2.40 | 2.45 | 2.15 |
| ET6/CT6 | 0.65 | 0.65 | 0.72 | 0.32 | 0.72 | 0.79 | 0.79 | 0.72 | 0.52 |

The present disclosure further provides an imaging device, having a photosensitive element which may be a photosensitive Charge-Coupled Device (CCD) or a Complementary Metal-Oxide Semiconductor (CMOS). The imaging device may be an independent imaging device such as a digital camera, or may be an imaging module integrated in a mobile electronic device such as a mobile phone. The imaging device is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, comprising: a first lens, a second lens, a third lens, a fourth lens, a fifth lens and a sixth lens, which are sequentially arranged from an object side to an image side of the optical imaging lens group along an optical axis,
   wherein,
   the first lens has a refractive power, an object-side surface of the first lens is a concave surface, and an image-side surface of the first lens is a convex surface;
   the second lens has a positive refractive power;
   the third lens has a negative refractive power;
   the fourth lens has a refractive power;
   the fifth lens has a negative refractive power, and
   the sixth lens has a refractive power;
   wherein 1.5<f2/R3<2, where f2 is an effective focal length of the second lens and R3 is a radius of curvature of an object-side surface of the second lens.

2. The optical imaging lens group according to claim 1, wherein tan(HFOV)<0.5,
   where HFOV is half of a maximal field-of-view of the optical imaging lens group.

3. The optical imaging lens group according to claim 1, wherein −2.5<f/f3<−1,
   where f is a total effective focal length of the optical imaging lens group and f3 is an effective focal length of the third lens.

4. The optical imaging lens group according to claim 1, wherein −2<f/f5<−0.5,
   where f is a total effective focal length of the optical imaging lens group and f5 is an effective focal length of the fifth lens.

5. The optical imaging lens group according to claim 1, wherein 2<R1/R8<3.2,
   where R1 is a radius of curvature of the object-side surface of the first lens and R8 is a radius of curvature of an image-side surface of the fourth lens.

6. The optical imaging lens group according to claim 5, wherein −1.5<R2/f<−0.5,
   where R2 is a radius of curvature of the image-side surface of the first lens and f is a total effective focal length of the optical imaging lens group.

7. The optical imaging lens group according to claim 1, wherein 0<CT6/CT2<1,
   where CT6 is a center thickness of the sixth lens along the optical axis and CT2 is a center thickness of the second lens along the optical axis.

8. The optical imaging lens group according to claim 1, wherein 0<T34/T56<1,
   where T34 is a spaced interval between the third lens and the fourth lens along the optical axis and T56 is a spaced interval between the fifth lens and the sixth lens along the optical axis.

9. The optical imaging lens group according to claim 1, wherein |f/f1|<0.5,
   where f is a total effective focal length of the optical imaging lens group and f1 is an effective focal length of the first lens.

10. The optical imaging lens group according to claim 9, wherein both of the object-side surface and the image-side surface of the first lens are spherical.

11. The optical imaging lens group according to claim 1, wherein 1.6<CT1/T12<2.6,
    where CT1 is a center thickness of the first lens along the optical axis and T12 is a spaced interval of the first lens and the second lens along the optical axis.

12. The optical imaging lens group according to claim 1, wherein 0.3<ET6/CT6<8,
    where ET6 is an edge thickness at a maximum effective radius of the sixth lens and CT6 is a center thickness of the sixth lens along the optical axis.

13. The optical imaging lens group according to claim 1, wherein 1<f/f23<2,
    where f is a total effective focal length of the optical imaging lens group and f23 is a combined focal length of the second lens and the third lens.

14. An optical imaging lens group, comprising: a first lens, a second lens, a third lens, a fourth lens, a fifth lens and a sixth lens, which are sequentially arranged from an object side to an image side of the optical imaging lens group along an optical axis, wherein, the first lens has a refractive power, an object-side surface of the first lens is a concave surface, and an image-side surface of the first lens is a convex surface;

the second lens has a positive refractive power;

the third lens has a negative refractive power;

the fourth lens has a refractive power;

the fifth lens has a negative refractive power; and the sixth lens has a refractive power;

wherein $-1<f/f45<0$, where f is a total effective focal length of the optical imaging lens group and f45 is a combined focal length of the fourth lens and the fifth lens.

15. The optical imaging lens group according to claim 14, wherein $-2<f/f5<-0.5$, where f is the total effective focal length of the optical imaging lens group and f5 is an effective focal length of the fifth lens.

16. The optical imaging lens group according to claim 14, wherein $1<f/f23<2$, where f is the total effective focal length of the optical imaging lens group and f23 is a combined focal length of the second lens and the third lens.

17. The optical imaging lens group according to claim 14, wherein $-2.5<f/f3<-1$, where f is the total effective focal length of the optical imaging lens group and f3 is an effective focal length of the third lens.

18. The optical imaging lens group according to claim 14, wherein $|f/f1|<0.5$, where f is the total effective focal length of the optical imaging lens group and f1 is an effective focal length of the first lens.

19. The optical imaging lens group according to claim 14, wherein $2<R1/R8<3.2$, where R1 is a radius of curvature of the object-side surface of the first lens and R8 is a radius of curvature of an image-side surface of the fourth lens.

20. The optical imaging lens group according to claim 14, wherein $-1.5<R2/f<-0.5$, where R2 is a radius of curvature of the image-side surface of the first lens and f is the total effective focal length of the optical imaging lens group.

* * * * *